United States Patent
Carrier et al.

(10) Patent No.: US 7,602,146 B2
(45) Date of Patent: Oct. 13, 2009

(54) PROTECTION METHODS, PROTECTION CIRCUITS AND PROTECTION DEVICES FOR SECONDARY BATTERIES, A POWER TOOL, CHARGER AND BATTERY PACK ADAPTED TO PROVIDE PROTECTION AGAINST FAULT CONDITIONS IN THE BATTERY PACK

(75) Inventors: David A. Carrier, Aberdeen, MD (US); Steven J. Phillips, Ellicott City, MD (US); Jeffrey J. Francis, Nottingham, MD (US); R. Roby Bailey, New Park, PA (US); Danh Thanh Trinh, Parkville, MD (US); Andrew E. Seman, Jr., White Marsh, MD (US); Christopher R. Yahnker, Raleigh, NC (US); Daniele C. Brotto, Baltimore, MD (US)

(73) Assignee: Black & Decker Inc., Newark, DE (US)

( * ) Notice: Subject to any disclaimer, the term of this patent is extended or adjusted under 35 U.S.C. 154(b) by 0 days.

(21) Appl. No.: 12/079,429

(22) Filed: Mar. 26, 2008

(65) Prior Publication Data

US 2008/0180059 A1 Jul. 31, 2008

Related U.S. Application Data

(62) Division of application No. 10/959,193, filed on Oct. 7, 2004.

(60) Provisional application No. 60/510,128, filed on Oct. 14, 2003, provisional application No. 60/551,803, filed on Mar. 11, 2004.

(51) Int. Cl.
*H02J 7/00* (2006.01)

(52) U.S. Cl. ............... 320/120; 320/134; 320/137; 320/116

(58) Field of Classification Search ............... 320/115, 320/116, 106, 134, 137, 120; 429/54, 53, 429/56

See application file for complete search history.

(56) References Cited

U.S. PATENT DOCUMENTS

| | | | |
|---|---|---|---|
| 4,943,497 A * | 7/1990 | Oishi et al. | 429/53 |
| 5,250,891 A | 10/1993 | Glasgow | |
| 5,617,017 A | 4/1997 | Moyer | |
| 5,680,027 A | 10/1997 | Hiratsuka et al. | |
| 5,886,502 A | 3/1999 | Higashijima | |
| 6,051,955 A | 4/2000 | Saeki et al. | |
| 6,274,264 B1 * | 8/2001 | Azema | 429/53 |
| 6,878,481 B2 * | 4/2005 | Bushong et al. | 429/54 |
| 2001/0011881 A1 | 8/2001 | Emori et al. | |
| 2002/0175656 A1 | 11/2002 | Matsunaga et al. | |
| 2003/0011345 A1 | 1/2003 | Hanafusa et al. | |
| 2003/0044689 A1 | 3/2003 | Miyazaki et al. | |
| 2003/0122526 A1 | 7/2003 | Yugo et al. | |

* cited by examiner

*Primary Examiner*—Akm E Ullah
*Assistant Examiner*—Alexis Boateng
(74) *Attorney, Agent, or Firm*—Harness Dickey & Pierce, P.L.C.

(57) ABSTRACT

In a cordless power tool system, protection methods, circuits and devices are provided to protect against fault conditions within a battery pack that is operatively attached to a power tool or charger, so as to prevent internal or external damage to the battery pack or attached tool or charger. The exemplary methods, circuits and devices address fault conditions such as over-charge, over-discharge, over-current, over-temperature, etc.

12 Claims, 20 Drawing Sheets

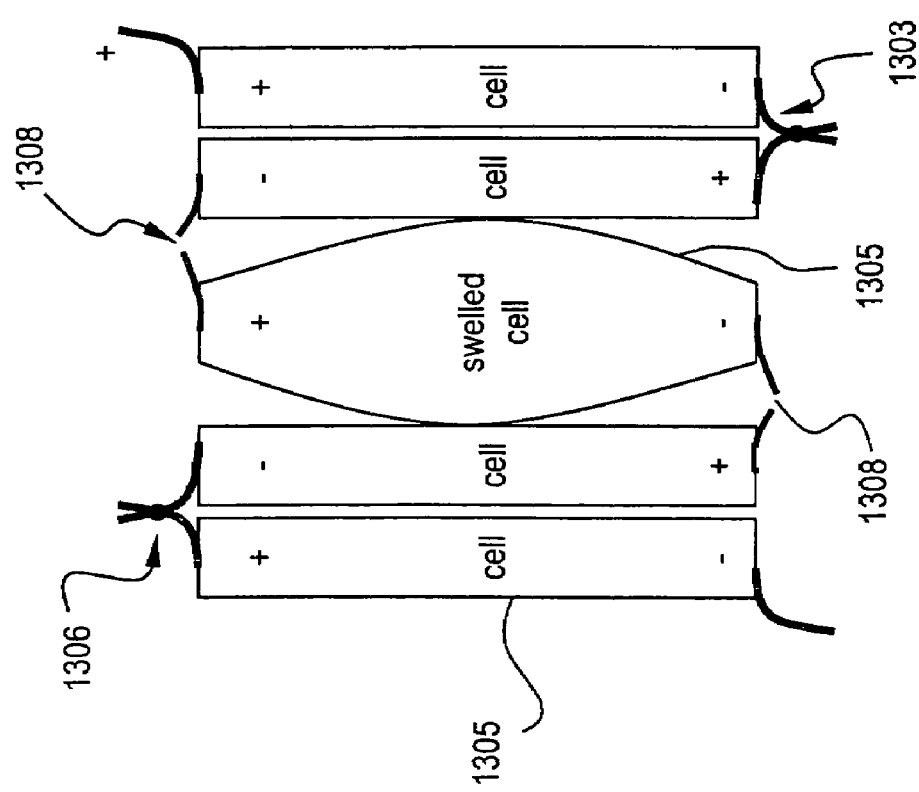

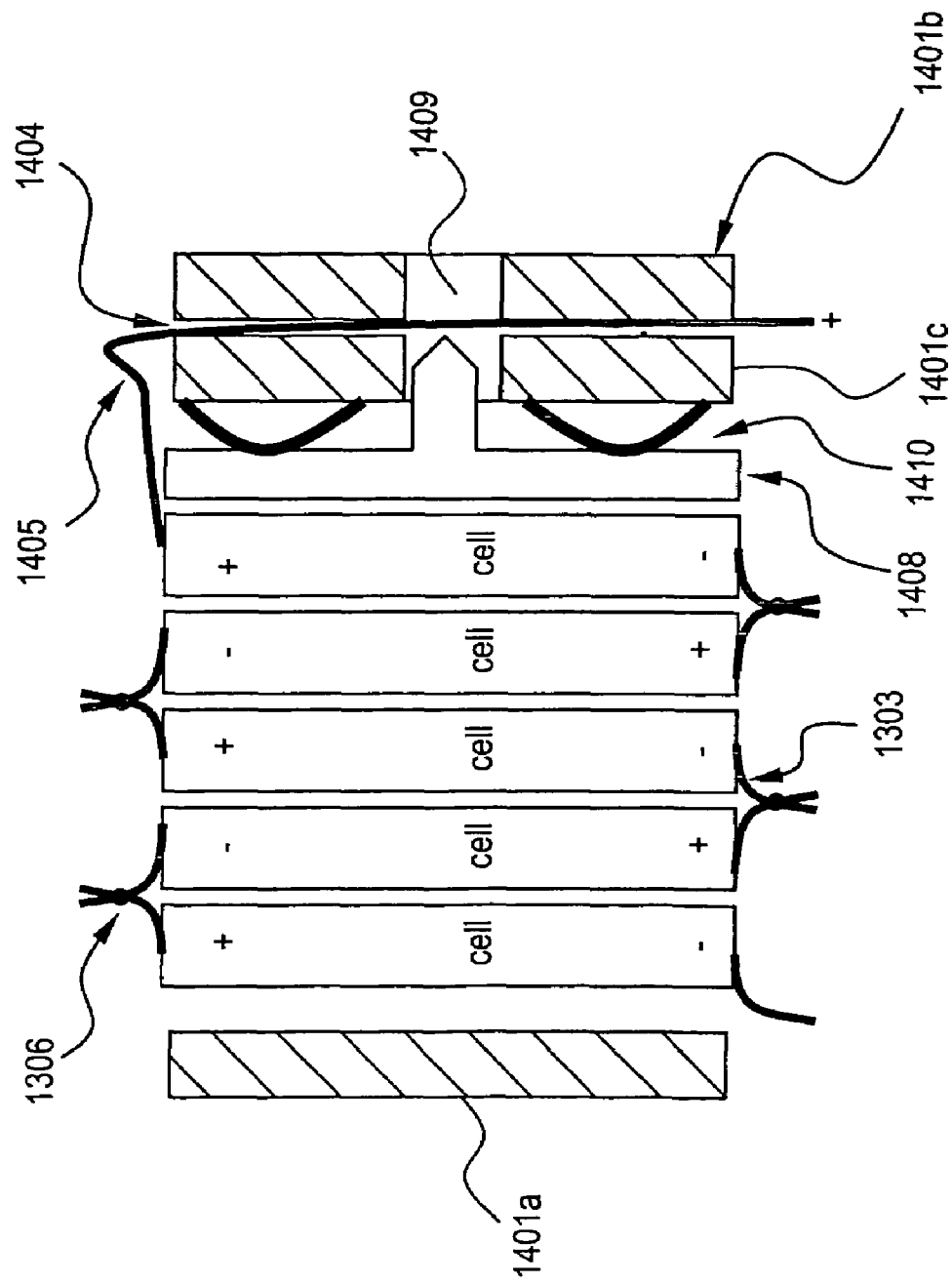

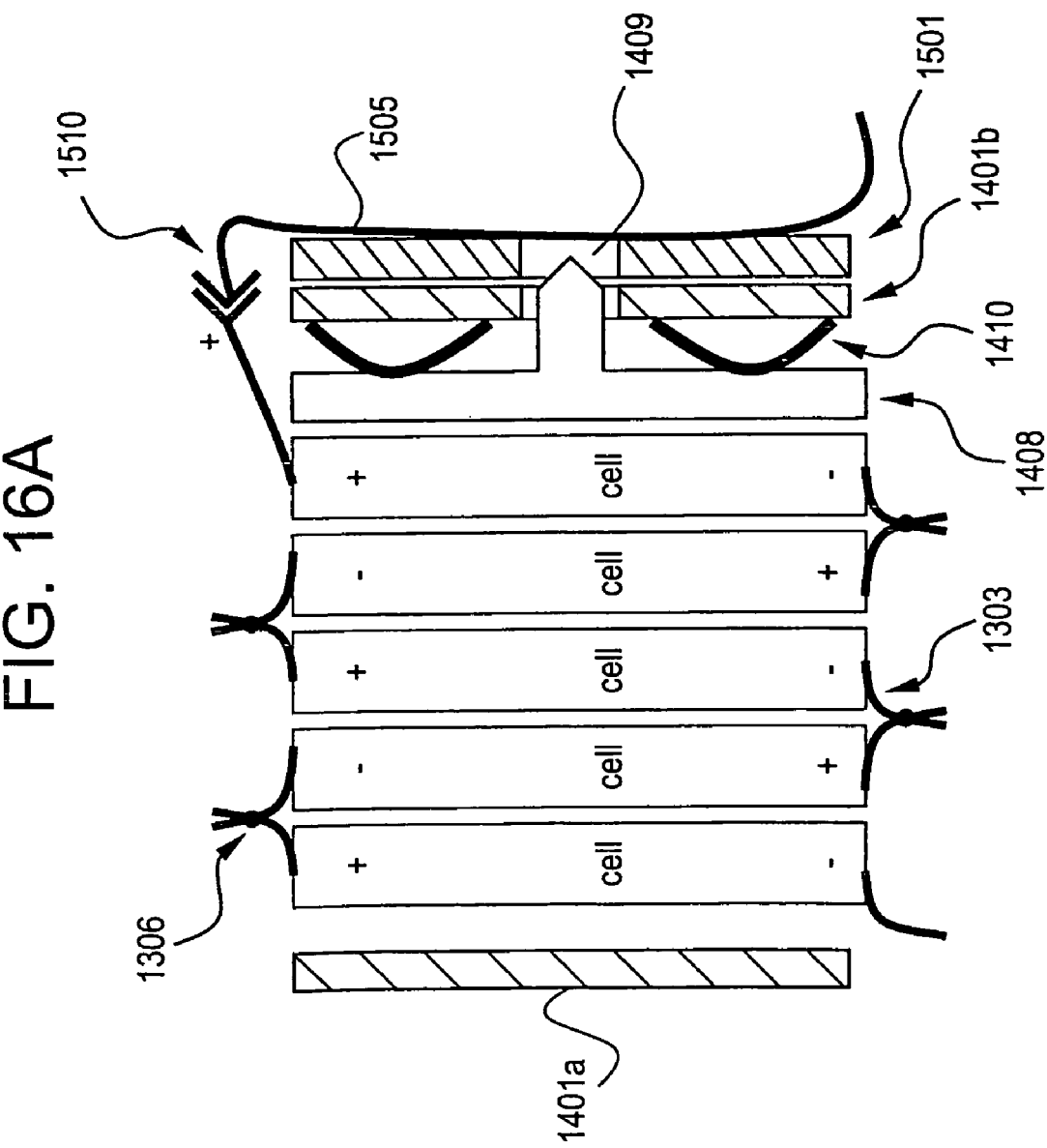

PROTECTION METHODS, PROTECTION CIRCUITS AND PROTECTION DEVICES FOR SECONDARY BATTERIES, A POWER TOOL, CHARGER AND BATTERY PACK ADAPTED TO PROVIDE PROTECTION AGAINST FAULT CONDITIONS IN THE BATTERY PACK

CROSS-REFERENCE TO RELATED APPLICATIONS

This application is a divisional of U.S. patent application Ser. No. 10/959,193 filed on Oct. 7, 2004 which claims the benefit of U.S. Provisional Application No. 60/510,128, filed on Oct. 14, 2003 and U.S. Provisional Application No. 60/551,803, filed on Mar. 11, 2004. The entire contents of the disclosures for each of these applications are incorporated herein by reference.

BACKGROUND OF THE INVENTION

1. Field of the Invention

The present invention relates to protection methods, protection circuits and protective devices for rechargeable batteries, to a power tool and charger adapted to provide protection for cells of an attached battery pack, and to a battery pack including protection control therein, each protecting the battery back against various potential fault conditions.

2. Description of Related Art

Over the past few years, lithium-ion (Li-ion) batteries have begun replacing nickel-cadmium (NiCd), nickel-metal-hydride (NiMH), and lead-acid batteries in low-voltage, portable electronic devices such as notebook-type personal computers. As compared to NiCd and NiMH batteries, Li-ion batteries are lighter but have a larger capacity per unit volume. For this reason, the Li-ion batteries have been typically suitable to low-voltage devices that are preferably light and which are required to endure continuous use for a long time. In an over-discharged state, however, the Li-ion batteries deteriorate rapidly, thus Li-ion batteries require over-discharge protection.

A battery pack used in a portable electronic device typically has a plurality of battery cells connected in series. The maximum number of battery cells connected in series in one battery pack is determined by the output voltage of the battery pack. For instance, the typical output voltage of one NiCd battery cell or one NiMH battery cell is 1.2 V. Assuming that an 18V output voltage from a battery pack is suitable for most general purpose electronic devices, the maximum number of NiCd or NiMH battery cells connected in series in the battery pack is 15. On the other hand, the typical output voltage of one Li-ion battery cell is approximately 3.6 V. Accordingly, the maximum number of Li-ion battery cells connected in series in one fictional 18V Li-ion battery pack would be 5.

Unlike a NiCd battery pack and a NiMH battery pack, the Li-ion battery pack may include functionality to protect against fault conditions inside and outside the Li-ion battery pack. This prevents cells in the Li-ion battery pack from deteriorating and shortening useful life of the pack. For instance, if a fault condition such as short-circuiting occurs inside or outside the Li-ion battery, a fuse may be provided to cut off an over-discharging current or an overcharging current, if the discharging current or charging current becomes larger than a given current level.

Currently, protection circuits in battery packs such as Li-ion battery packs are designed primarily for low-voltage portable electronic devices such as notebook-type personal computers, cellular phones, etc., which require voltage generally on the order of 2 to 4 volts. Such devices are characterized by using battery packs composed of cells (such as Li-ion, NiCd, NiMH cells) that provide a maximum output voltage of about 4.2 volts/cell. For Li-ion battery cells, care must be taken to prevent damage from electrical and mechanical stresses, since lithium is a highly reactive substance.

Conventional protection circuits for these low-voltage battery packs may monitor cell voltages to prevent a given cell from over-charging or over-discharging, and may monitor current to keep current from rising too high. Other protection circuits may have one or more temperature inputs to disable current during charge or discharge until the battery pack cools down. Still other protection circuits may be designed to help maintain the balance of charge on the cells, commonly known as equalization circuits. A typical protection circuit may be connected to a given battery cell or group of cells in the battery pack to avoid these situations. For example, a conventional protection circuit may typically include a pair of MOSFET's or other semiconductors that can stop current flow in either direction.

However, much higher voltages than described above are required for higher-power electronic devices such as cordless power tools. Accordingly, higher-power battery packs may be in the process of being developed for cordless power tools. Such "high-power" battery packs may provide higher voltage outputs than conventional NiCd and NiMH battery packs (and substantially higher power than conventional Li-ion packs used for PCs and cell phones), and at a much reduced weight (as compared to conventional NiCd or NiMH battery packs used as power sources in conventional cordless power tools). A characteristic of these battery packs is that the battery packs may exhibit substantially lower impedance characteristics than conventional NiCd, NiMH and/or even the lower power Li-ion packs.

Further, as these battery technologies advance, the introduction of lower impedance chemistries and construction styles to develop secondary batteries generating substantially higher output voltages (of at least 18 V and up, for example) may possibly create several additional protection issues. Battery packs having lower impedance also means that the pack can supply substantially higher current to an attached electronic component, such as a power tool. As current through a motor of the attached power tool increases, demagnetization forces (e.g., the number of armature turns of the motor times the current, ampere-turns) could substantially increase beyond a desired or design limit in the motor. Such undesirable demagnetization could thus potentially burn up the motor.

For example, a lower impedance electrical source could cause damage to a tool's motor when the tool is held at stall condition. During motor stall, the motor and battery impedances are the only mechanisms to limit the current since there is no back-EMF created by the motor. With a lower impedance pack, the currents would be higher. Higher currents through the motor will increase the likelihood of de-magnetization of the permanent magnets within the tool's motor.

Additionally, start-up of the tool could produce excessive starting currents and cause demagnetization of the motor. Thermal overload could also be a result of using a low impedance electrical source in an existing power tool, as the new batteries may be designed to run longer and harder than what the original cordless tool system was designed.

Accordingly, different protection controls may need to be in place to address potential fault conditions that could occur in high power battery packs that are adapted for use with both existing cordless power tools, and developing lines of power tools that are manufactured for use with these higher power battery packs. In particular, protection controls need to be developed to handle fault conditions such as over-charge, over-discharge, over-current, over-temperature and cell imbalance which could occur in one or more cells of a battery pack (such as a Li-ion or NiCd pack), so as to prevent internal or external damage to the pack, an attached device such as a charger or tool or to a user in the vicinity of a pack connected to a charger or tool.

SUMMARY OF THE INVENTION

In a cordless power tool system including a battery pack, exemplary embodiments of the present invention are directed to protection methods, protection arrangements and/or devices designed to protect against fault conditions in the battery pack operatively attached to the power tool or charger, so as to prevent internal or external damage to the battery pack or attached tool or charger. The exemplary methods, circuits and devices address fault conditions in the battery pack such as over-charge, over-discharge, over-current, over-temperature, etc.

BRIEF DESCRIPTION OF THE DRAWINGS

The exemplary embodiments of the present invention will become more fully understood from the detailed description given herein below and the accompanying drawings, wherein like elements are represented by like reference numerals, which are given by way of illustration only and thus are not limitative of the exemplary embodiments of the present invention.

FIGS. 13B and 13C illustrate a device for protecting against an overcharge condition in accordance with an exemplary embodiment of the present invention.

FIGS. 14A and 14B illustrate a device for protecting against an overcharge condition in accordance with another exemplary embodiment of the present invention.

FIGS. 16A and 16B illustrate a device for protecting against an overcharge condition in accordance with another exemplary embodiment of the present invention.

DETAILED DESCRIPTION OF THE EXEMPLARY EMBODIMENTS

Figure 17:
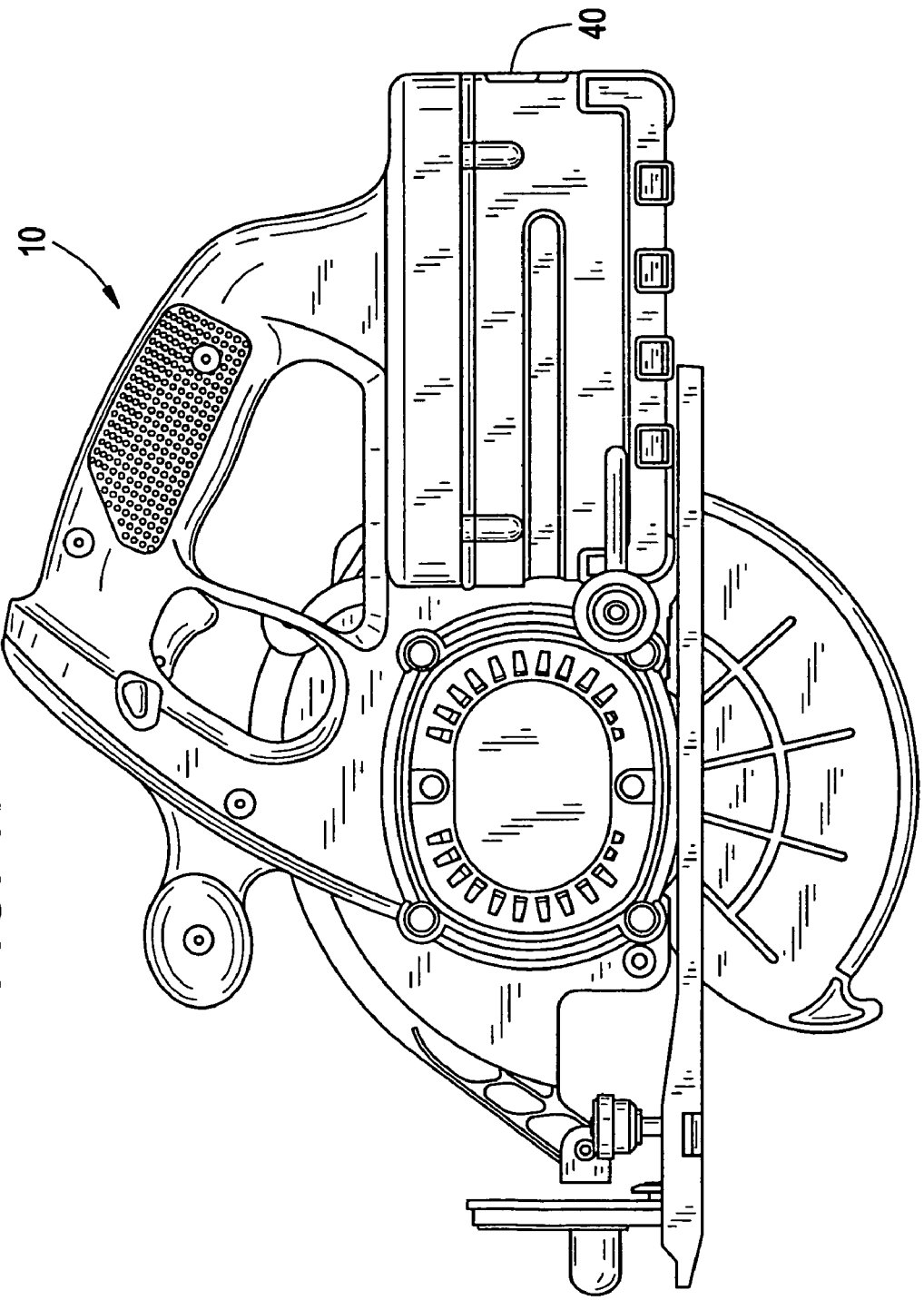
FIGS. 17-19 illustrate exemplary cordless power tools of a cordless power tool system in accordance with an exemplary embodiment of the present invention.
Figure 18:
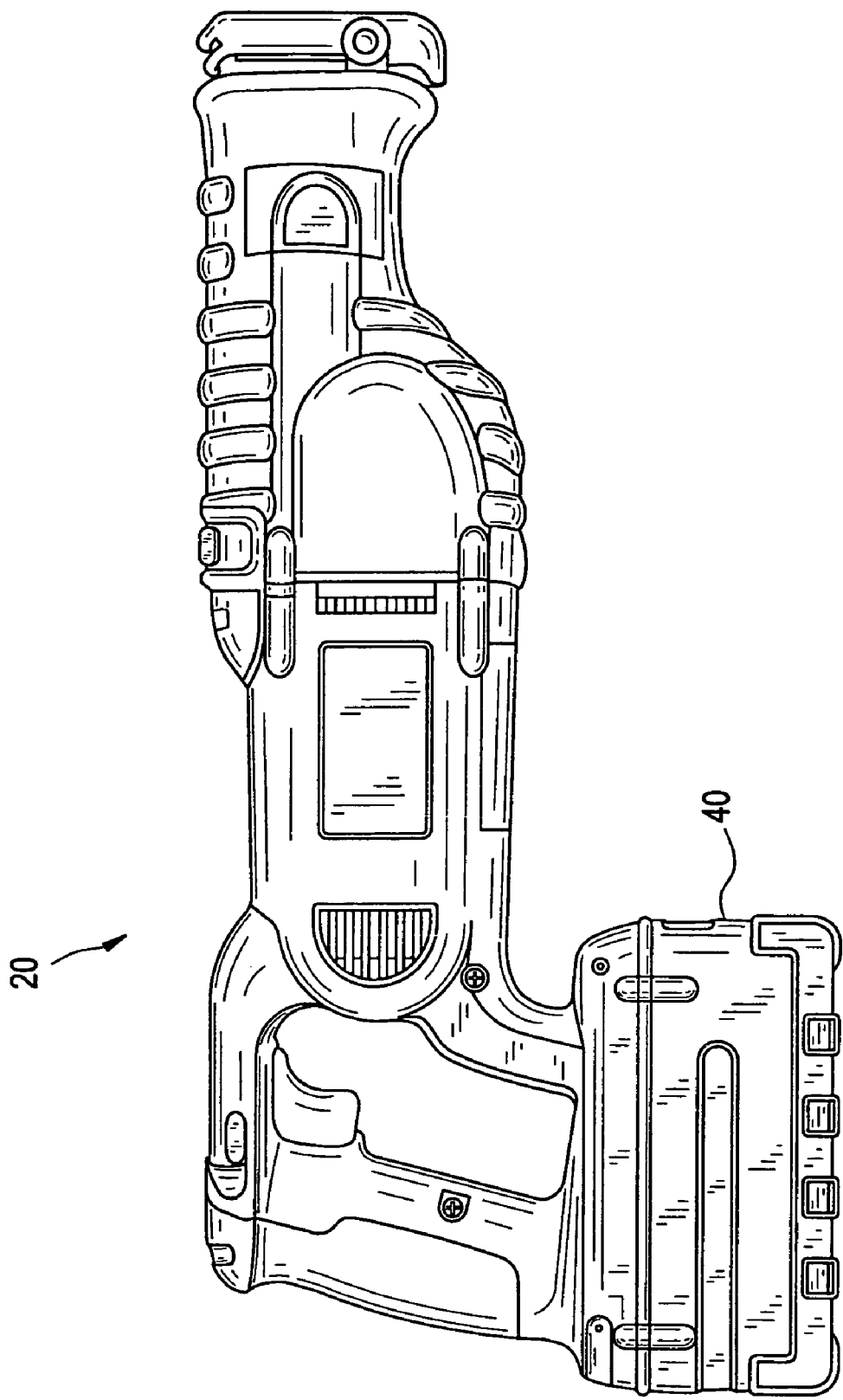
Figure 19:
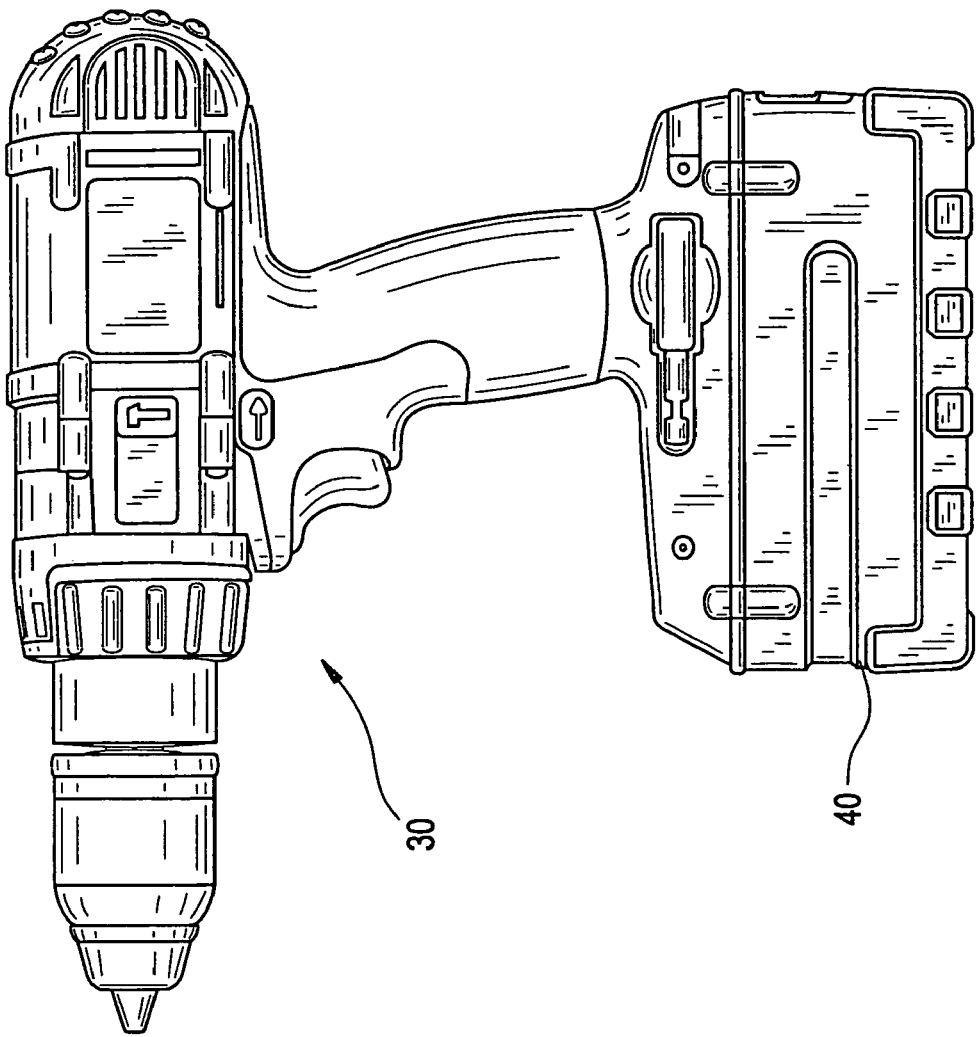

With general reference to the drawings, a system of cordless power tools constructed in accordance with the teachings of exemplary embodiments of the present invention is illustrated. Exemplary cordless power tools of the system are shown to include, by way of examples, a circular power saw 10 (FIG. 17), a reciprocating saw 20 (FIG. 18) and a drill 30 (FIG. 19). The tools 10, 20 and 30 each may include a conventional DC motor (not shown) adapted to be powered by a power source having a given nominal voltage rating. In the exemplary embodiments, the tools 10, 20 and 30 may be driven by a removable power source having a nominal voltage rating of at least 18 volts. It will become evident to those skilled that the present invention is not limited to the particular types of tools shown in the drawings nor to specific voltages. In this regard, the teachings of the present invention may be applicable to virtually any type of cordless power tool and any supply voltage.

With continued reference to the drawings, the removable power source which may be embodied as a battery pack 40. In the exemplary embodiments illustrated, the battery pack may be a rechargeable battery pack 40. Battery pack 40 may include a plurality of battery cells connected in series, and/or a plurality of serially-connected strings of cells, in which the strings are in parallel with one another. For purposes of describing the exemplary embodiments of the present invention, battery pack 40 may be composed of cells having a lithium-ion cell chemistry. As the exemplary embodiments are directed to the cordless power tool environment, which requires power sources having much higher voltage ratings than conventional low voltage devices using Li-ion battery technology, (such as laptop computers and cellular phones) the nominal voltage rating of the battery pack 40 may be at least 18V.

However, pack 40 may be composed of cells of another lithium-based chemistry, such as lithium metal or lithium polymer, or other chemistry such as nickel cadmium (NiCd), nickel metal hydride (NiMH) and lead-acid, for example, in terms of the chemistry makeup of individual cells, electrodes and electrolyte of the pack 40.

Figure 1:
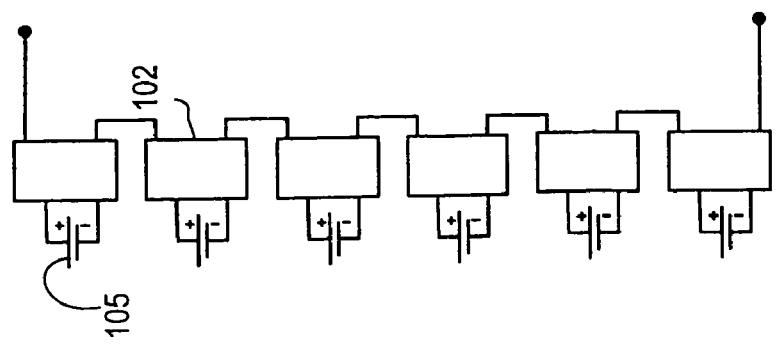
FIG. 1 illustrates a partial block diagram of a protection circuit arrangement in accordance with an exemplary embodiment of the present invention.

FIG. 1 illustrates a partial block diagram of a protection circuit arrangement in accordance with an exemplary embodiment of the present invention. FIG. 1 illustrates a portion of a battery circuit and in particular illustrates an individual protection device 102 for each cell 105 of a battery pack such as battery pack 40 in FIGS. 17-19. In FIG. 1, each protection device 102 may be adapted to perform a current limiting function. In an example, the protection devices 102 may be embodied as thermistor devices, where a thermistor device is part of or contained inside the cell.

A thermistor is a term used to describe a range of electronic components whose principle characteristic is that their electrical resistance changes in response to changes in their temperature, a 'thermally sensitive resistor'. Thermistors may be further classified as 'Positive Temperature Coefficient' devices (PTC devices) or 'Negative Temperature Coefficient' devices (NTC devices). PTC devices are devices whose resistance increases as their temperature increases. NTC devices are devices whose resistance decreases as their temperature increases. NTC thermistors are typically manufactured from proprietary formulations of ceramic materials based on transition metal oxides.

In FIG. 1, the protection devices 102 may be embodied as PTC devices, which may protect the string of cells from thermal overload. If any cell becomes hot, the PTC device within that cell increases in resistance to limit the current through the entire string. This method of protection of battery cells may have a drawback in that it requires many devices (PTC's in this example) performing a current limiting function as protection device 102.

Figure 2:
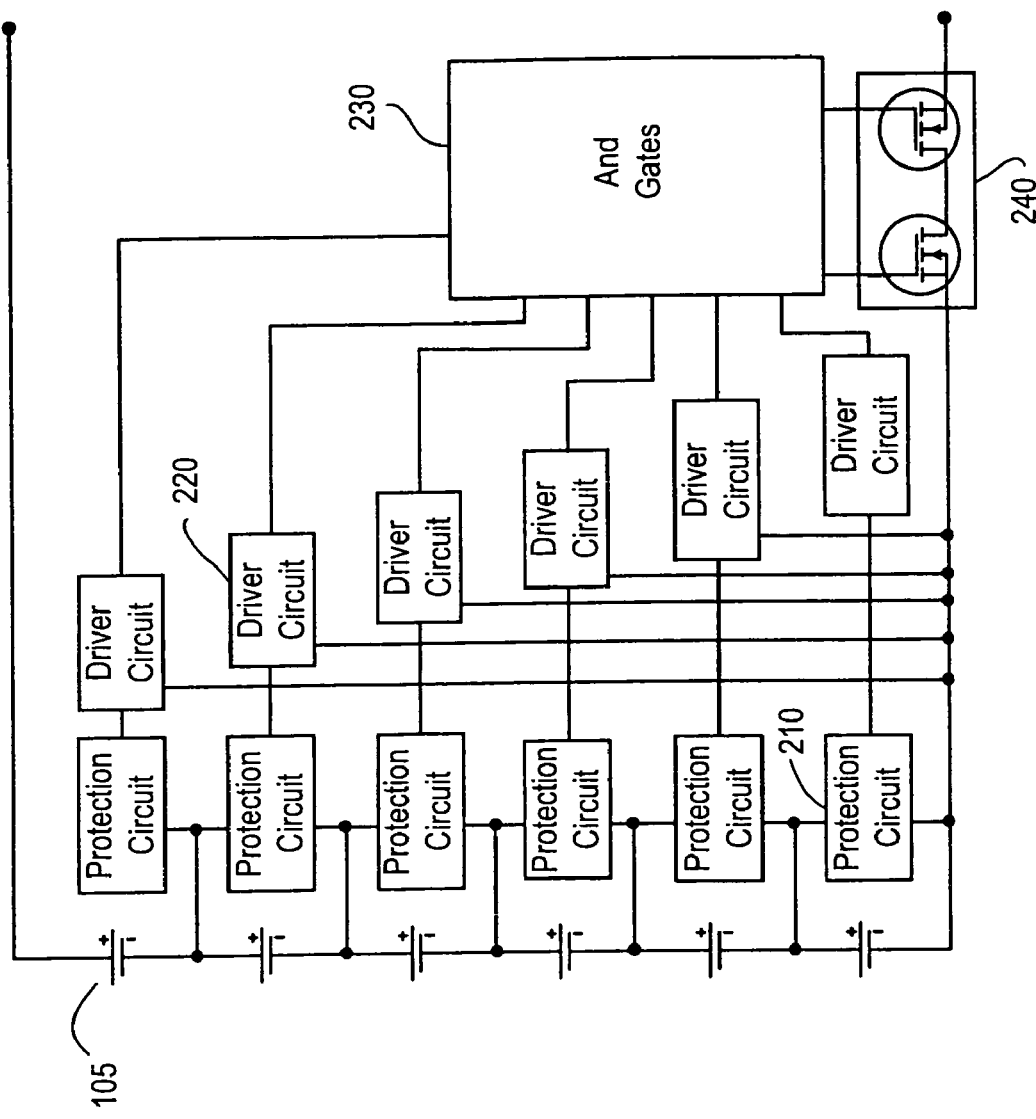
FIG. 2 illustrates a partial block diagram of a protection circuit arrangement in accordance with another exemplary embodiment of the present invention.

FIG. 2 illustrates a partial block diagram of a protection circuit arrangement in accordance with another exemplary embodiment of the present invention. An alternative approach to using multiple protection devices 102 is to include a dedicated protection circuit 210 for each cell that senses one or more battery pack parameter in a pack such as battery pack 40, for example. These parameters include, but are not limited to current, temperature, voltage and impedance through the pack. A protection circuit 210 may be operatively connected to a corresponding driver circuit 220. The level-shifting circuits 220 may be connected to a plurality of AND gates (shown by box 230) to link the protection circuit(s) 210 to a master device 240 which performs a current limiting or current interrupting function. If any protection circuit detects a problem it can change from an output high to an output low state. The AND gates ensure that all protection circuit outputs are high (OK) to turn master device 240 on. Additionally, it is envisioned that the reverse logic could be used with the protection devices output to be normally low and using NOR gates instead. The master device 240 may be embodied as semiconductor device such as a metal-oxide semiconductor field effect transistor (MOSFET), as shown in FIG. 2. Accordingly, if a battery pack has multiple cells 105 in series, then an exemplary configuration envisions a set of protection circuits 210 (apportioned one per cell) connected to and controlling a master device 240 that enables/disables current flow, such as a MOSFET.

As discussed above, using multiple, dedicated protection circuits 210 may require a corresponding level-shifting circuit 220 that drops the voltage changes from the highest potential cells down to normal levels to switch the master semiconductor device 240, as shown in FIG. 2 for example. If monitoring each cell is excessive, then groups of cells or the entire battery pack may be monitored with a single protection circuit 210 and a single master device 240 for limiting or interrupting current.

Figure 3A:
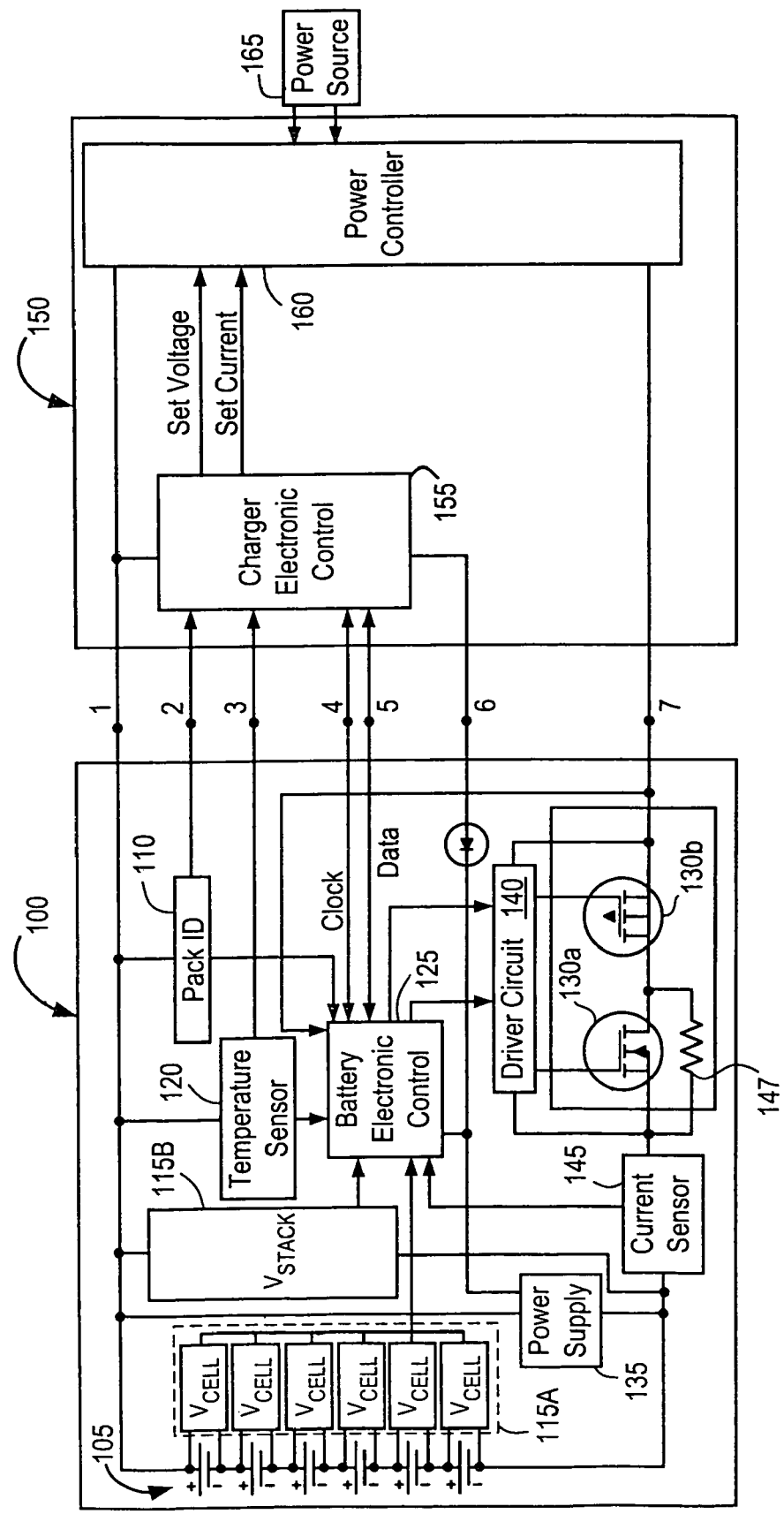
FIG. 3A is a block diagram illustrating components and connections between an exemplary battery pack and an exemplary battery charger in accordance with an exemplary embodiment of the present invention.

FIG. 3A is a block diagram illustrating components and connections between an exemplary battery pack and an exemplary battery charger in accordance with an exemplary embodiment of the present invention. FIG. 3A is merely an exemplary circuit configuration and is provided as a context for more clearly describing the various protection methods, circuits and devices in accordance with the exemplary embodiments.

Referring to FIG. 3A, battery pack 100 may include a plurality of battery cells 105 connected in series (six shown for simplicity, pack 100 could include more or less than six cells or may be composed of serial strings of cells with the serial strings in parallel with each other). For purposes of describing the exemplary embodiments of battery pack 100 may be composed of cells having a lithium-ion cell chemistry. As the exemplary embodiments are directed to the cordless power tool environment, which requires much higher voltage ratings than conventional devices using Li-ion battery technology, the nominal voltage rating of the battery pack 100 may be at least 18V.

Thus, battery pack 100 in FIG. 3A (and in FIG. 3B) may be applicable to and/or designed for cordless power tool systems comprising at least a cordless power tool, the battery pack and a charger. Pack 100 may be understood as a removable power source for high-power, power tool operations. In an example, battery pack 100 may have a nominal voltage rating of at least 18 volts and/or have a maximum power output of at least about 385 Watts. However, it should be evident to those skilled in the art that the present invention is not necessarily limited to the particular types of tools shown in FIGS. 17-19 nor to specific voltage ratings and/or power output specifications described above.

Pack 100 may further be composed of cells of another lithium-based chemistry, such as lithium metal or lithium polymer, or other chemistry such as nickel cadmium (NiCd), nickel metal hydride (NiMH) and lead-acid, for example, in terms of the chemistry makeup of individual cells, electrodes and electrolyte of the pack 100.

In FIG. 3A, seven terminal (terminals 1-7) are shown. However, the exemplary embodiments should not be limited to this terminal configuration, as more or less terminals could be included depending on the desired information passed between, or parameters monitored by, the pack 100 or charger 150.

The pack 100 may also include a Pack ID 110 connected to an output terminal (terminal 1) for identification of the pack 100 when inserted into a charger 150. The Pack ID 110 may include the model number, version, cell configuration and the battery type (chemistry), such as lithium-ion, NiCd or NiMH, for example. The Pack ID 110 may be embodied as one or more communication codes received from output terminal 1 of the battery pack 100 by an asynchronous full duplex communication system in the pack 100, such as is described in U.S. Pat. No. 5,680,027 to Hiratsuka et al. However, this is only one example, as the pack ID 110 may also be embodied by an ID resistor, LED display that displays identification data of the pack, serial data sent upon engagement and sensed by the tool/charger via terminal 2 for example, and/or a field in an frame of data sent over an air interface to the tool/charger, etc.

The pack 100 may further include one or more temperature sensors 120. Temperature sensor 120 may be embodied as NTC or PTC thermistors, Temperature sensing Integrated Circuits, or thermocouples. The temperature sensor 120 may communicate the temperature inside the battery pack 100 to intelligence in the battery pack 100 and/or to intelligence in a connected charger 150, for example, via terminal 3. As the function of such temperature sensors are known, a detailed explanation of functional operation is omitted for purposes of brevity. Power connections for charging and discharging are represented as terminals 1 and 7.

A battery electronic control unit 125 may be responsible for the protection of the cells 105 for any fault condition exposed on the terminals by the user (via charger 150, an attached tool, and/or due to user tampering). The battery electronic control unit 125 may be embodied in hardware or software as a digital microcontroller, a microprocessor or an analog circuit, a digital signal processor or by one or more digital ICs such as application specific integrated circuits (ASICs), for example.

The discharge current and charge current can be clamped or discontinued by the use of semiconductor devices 130a (discharge FET) and 130b (charge FET), under the control of battery electronic control unit 125. The battery electronic control unit 125 may be powered by an internal power supply 135 as shown, and the semiconductor devices 130a and 130b may be linked through a driver circuit 140.

Battery pack 100 may further include a current sensor 145 which senses current and provides a signal to battery electronic control unit 125. Current sensor 145 may be embodied as known components for current sensors, such as a shunt resistor, current transformer, etc. which may provide a signal representing sensed current in pack 100 to battery electronic control unit 125. Semiconductor devices 130a may include a pull down resistor 147 which acts to bypass the semiconductor device 130a when device 130a is off and the pack 100 is dormant.

Pack 100 may also include a voltage monitor circuit 115. Voltage monitor circuit 115 may be embodied by any known voltage monitor circuit, for example, and may be configured to sense individual cell voltage and/or sense total pack voltage of the string of cells 105 ('stack voltage') to provide a signal representing the individual cell or stack voltage to battery electronic control unit 125. As a variant, and instead of a single voltage monitor circuit 115 configured to sense both individual cell and total stack voltage, pack 100 could include a voltage monitor circuit as shown in FIG. 3A, comprising a first plurality of voltage monitor circuits (shown generally as 115A) for sensing individual cell voltage and a second voltage monitor circuit 115B for sensing total stack voltage of the cells 110, for example.

Referring back to FIG. 2, for example, protection circuit 210 may include at least battery electronic control unit 125, current sensor 145, a voltage monitor circuit 115 and temperature sensor 120, and optionally may further include pack ID 110 and an internal power supply such as power supply 135. Driver circuit 140 may be analogous to driver circuit 220 in FIG. 2 and semiconductor devices 130a and 130b may singly or together represent a master device 240 having a current limiting/interrupting functionality under the control of the protection circuit 210.

Referring to FIG. 3A, during discharge, the battery electronic control unit 125 may output pulse width modulation (PWM) control signals to drive the driver circuit 140. For example, a pulsing semiconductor (pulse width modulator (PWM)) is commonly used in the electronics industry to create an average voltage that is proportional to the duty cycle. PWM is modulation in which the duration of pulses is varied in accordance with some characteristic of the modulating signal. Alternatively pulse frequency modulation could be used to create this average voltage. In either case, the semiconductor devices 130a and 130b (which may be embodied as a discharge FET and charge FET respectively) may be switched between ON and OFF states to create an average voltage that is proportional to the duty cycle at which it is switched.

During discharge, the driver circuit 140 level shifts the PWM output of battery electronic control unit 125 to drive the gate of semiconductor device 130a, cycling the semiconductor devices 130a on and off depending on sensed conditions. Since the semiconductor device 130b is reverse-biased, the device 130b passes current with only a diode drop in voltage. If the current were at 20 Amps and device 130b had a forward voltage of 0.6 Volts the power loss would be only 12 watts. If lower losses are desired, the battery electronic circuit 125 may output a state to the driver circuit 140 which commands the semiconductor device 130b to remain on during the PWM action on semiconductor device 130a. Now, the power lost into device 130b would be its on resistance time the current squared ($I^2R_{ON}$). Today's MOSFETs typically have an on-resistance ($R_{ON}$) of 10 milliohms, so at 20 Amps the power loss would only be 4 watts. The result is a controlled discharge and lower losses through the semiconductor device.

During charge, the reverse logic can be applied. Semiconductor device 130a is reversed-biased with respect to current flow and even though it conducts in the OFF state, device 130a should remain ON for the least amount of losses. Semiconductor device 130b may control the charge current based on information from the battery electronic control 125 going through the driver circuit 140. The component arrangement that comprises driver circuit 140 is known in the art and is not described herein for reasons of brevity.

When battery pack 100 is connected to charger 150, a charger electronic control unit 155 in the charger 150 may be powered from the battery's internal power supply 135 through terminals 1 and 6. This is only an exemplary connection scheme, as other means for powering the charger electronic control unit 155 can be employed. The charger 150 could have its own supply or derive it directly from the battery voltage. The charger electronic control unit 155 may also be embodied in hardware or software as a digital microcontroller, microprocessor, analog circuit, digital signal processor, or by one or more digital ICs such as application specific integrated circuits (ASICs), for example. Battery and charger data and control information may be exchanged through serial data paths on terminals 4 and 5. The charger electronic control unit 155 may drive a power controller 160 with a set voltage and a set current to deliver the desired voltage and current from a power source 165 to the battery pack 100 via terminals 1 and 7.

Figure 3B:
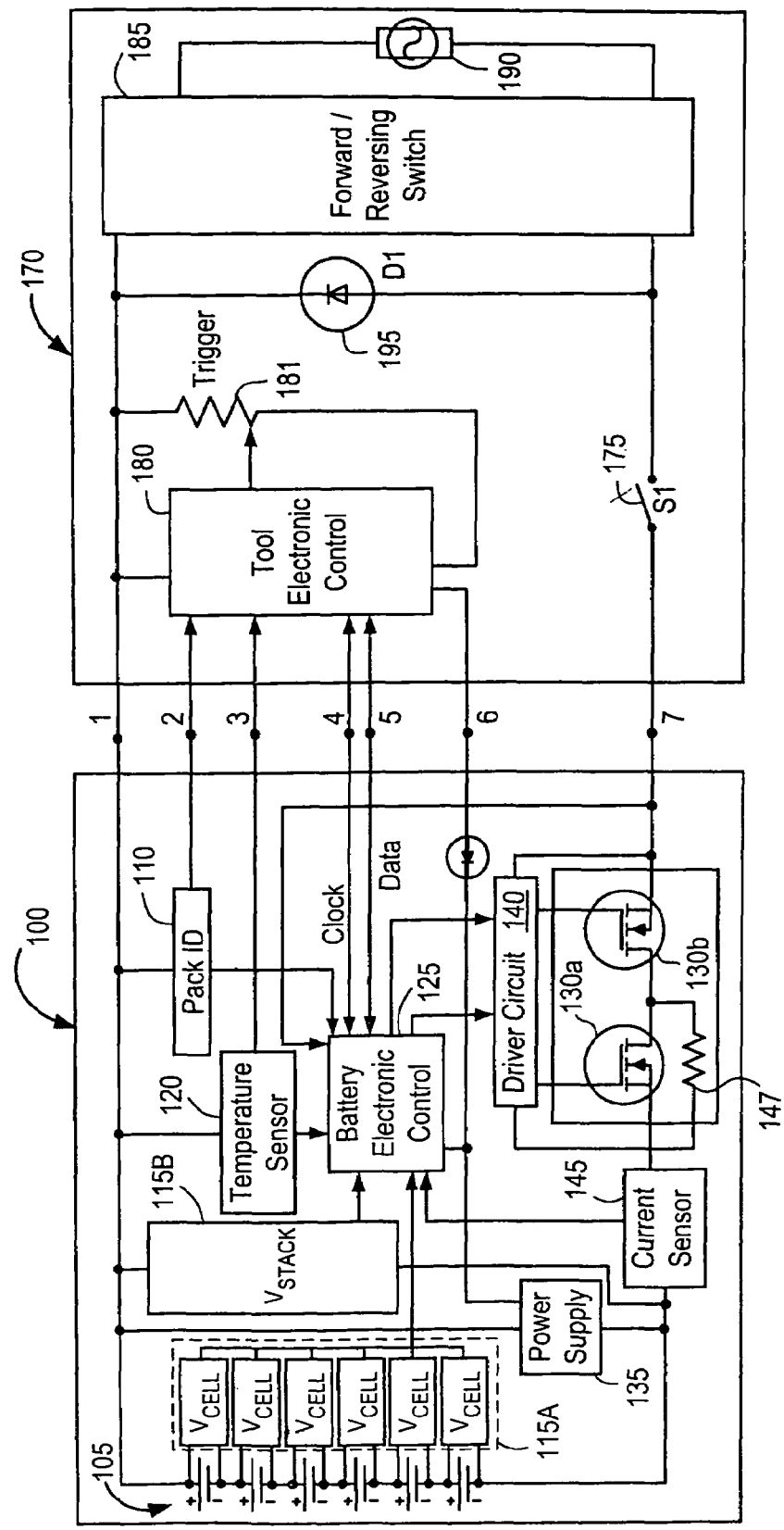
FIG. 3B is a block diagram illustrating components and connections between an exemplary battery pack and an exemplary power tool in accordance with an exemplary embodiment of the present invention.

FIG. 3B is a block diagram illustrating components and connections between an exemplary battery pack and an exemplary power tool in accordance with an exemplary embodiment of the present invention. FIG. 3B is merely an exemplary circuit configuration and is provided as a context for more clearly describing the various protection methods, circuits and devices in accordance with the exemplary embodiments. The battery pack and tool configuration of FIG. 3B may be applicable to the exemplary cordless tool systems, and equivalents, in any of FIGS. 17-19. In FIG. 3B, a 'smart' power tool 170 is illustrated, it being understood that battery pack 100 may be adapted for powering a 'dumb' power tool, i.e., a power tool without an intelligent device or microelectronic component control such as a microprocessor.

Referring to FIG. 3B, power tool 170 may be powered from the internal battery power supply 135 via terminals 1 and 6. The tool 170 may include a mechanical switch 175 that pulls terminal 7 high when the semiconductor device 130a (discharge FET) is off. If semiconductor device 130*a* is left off while the battery pack 100 is dormant, the voltage at terminal 7 is low because of the pull down resistor 147. This resistor value should have a substantially high resistance since it acts to bypass the semiconductor device 130*a*. With this pull down resistor 147 in place and the semiconductor device 130*a* in the off state, the voltage at terminal 7 remains low until a switch 175 in tool 170 is activated. The result is that power terminal 7 immediately increases in voltage and the signal through power terminal 7 could be used to wake the battery pack 100 from a dormant mode of operation. Tool 170 may include a tool electronic control unit 180. Tool electronic control unit 180 may also be embodied in hardware or software as a digital microcontroller, microprocessor, analog circuit, digital signal processor, or by one or more digital ICs such as application specific integrated circuits (ASICs), for example.

The tool electronic control unit 180 may be programmable so as to read a trigger position of a trigger 181 and report the trigger position to the battery electronic control unit 125 via serial data paths at terminals 4 and 5. Based on the trigger position data, the battery electronic control unit 125 may vary the PWM duty cycle through semiconductor device 130*a* to obtain the desired motor speed in tool motor 190. While semiconductor device 130*a* is off, a diode 195 in the tool 170 may re-circulate residual inductive motor current to prevent voltage spikes from occurring therein. The forward/reversing switch 185 is typical for cordless tools and will not be described here.

A dumb tool (not shown) may just have a trigger 181 configured as a potentiometer and connected to one of terminals 1, 4 or 5, and to terminal 6. The battery electronic control unit 125 may recognize the lack of serial data communications and perform an analog analysis of the voltage at terminals 4 or 5. Based on the analysis, the battery electronic control unit 125 may send PWM control signals via driver circuit 140 to cause semiconductor device 130*a* to switch at the desired duty cycle, so as to create an intended motor speed. Even dumber tools could exist as on/off tools. These tools require only the connection to terminals 1 and 7 for operation.

Over-charge Protection

There are two basic types of battery chargers used for recharging battery packs: trickle chargers and fast chargers. Trickle chargers are significantly less expensive than fast chargers; however a trickle charger requires approximately a ½ day for recharging a battery pack. A fast charger can recharge a battery pack within about an hour. An over-charge fault condition may occur because of some fault conditioner system failure in either the charger or battery pack. Typically, a protection circuit in the battery pack can detect an over-charge fault condition by monitoring voltage across the battery pack. During charge, the voltage reaches a particular threshold. The charger thus considers the battery pack 'fully charged' and the charge current is terminated. If the charger was locked-on due to a component failure, it is desirable for the battery pack to be able to disable the charging current with its own semiconductor device, such as charge FET (semiconductor device 130*b*) under the control of battery electronic control unit 125.

Over-charge control may be provided by use of a charge lock-on detection circuit (also known as a 'hardware watchdog circuit') between the battery pack and the charger. In general, if the charger locked-on and pulsing data (e.g., a clock provided from pack to charger via a suitable serial data path) stopped, then the hardware watchdog may automatically turn off the current flow.

A conventional hardware watchdog circuit is typically located in the charger. This circuit monitors the charge current and looks for a 10 ms current off reset pulse in the charging current. In a typical charging scenario, a microprocessor in the charger (such as charger electronic control unit 155) may generate this reset pulse using the charge control line $I_{CTRL}$. In an abnormal situation (e.g., the charger microprocessor has locked the current solid on or the charger power supply has locked the current solid on), the hardware watchdog circuit would timeout and turn the charge current off using a charge FET. However, in the conventional arrangement, it is still possible to overcharge the battery pack if the microprocessor in the charger were to continually generate the reset pulse without ever terminating the fast charge (due to improper microprocessor behavior, for example).

Figure 4:
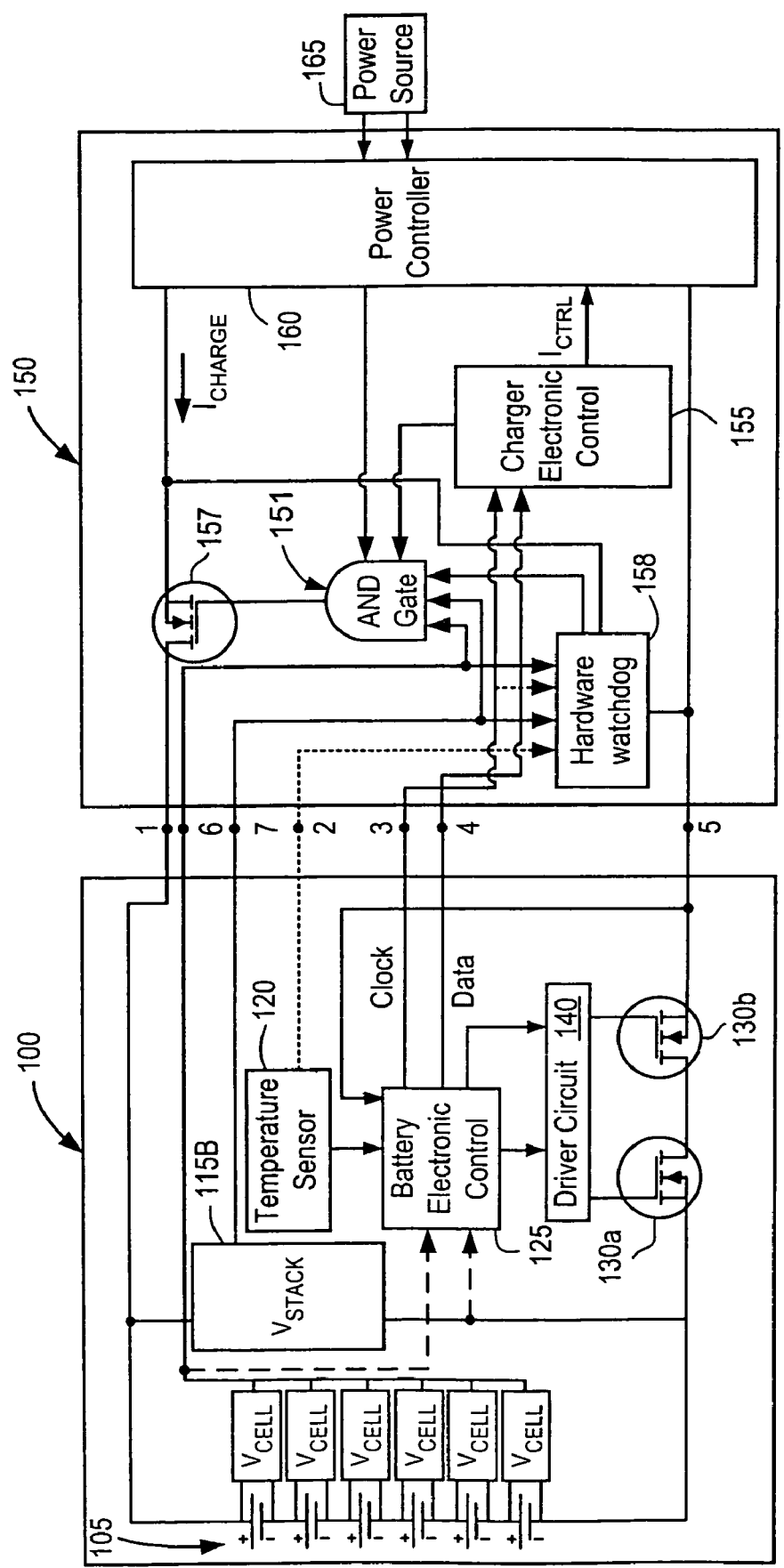
FIG. 4 is a partial block diagram of connections between a battery pack and charger to illustrate over-charge protection in accordance with an exemplary embodiment of the present invention.

FIG. 4 is a partial block diagram of connections between a battery pack and charger to illustrate over-charge protection in accordance with an exemplary embodiment of the present invention. In FIG. 4 seven terminals and six battery cells are shown for convenience, it being understood that more or less terminals and battery cells could be illustrated in the exemplary embodiment.

In FIG. 4, battery pack 100 includes at least a battery electronic control unit 125, semiconductor device 130*b* (such as charge control FET) and temperature sensor 120. The temperature sensor 120 may be embodied as an internal NTC thermistor, for example. The charger 150 may include at least charger electronic control circuit 155, a charge FET 157 and a hardware watchdog circuit 158.

The battery electronic control unit 125 may receive a battery temperature value from the internal NTC thermistor and may communicate this information via serial data paths at terminals 3 and/or 4 to the charger electronic control unit 155. In the event of an extreme battery temperature due to an overcharge condition, the charge current may be terminated by the battery electronic control circuit 125 sending a PWM control signal or pulse, via driver circuit 140, to turn semiconductor device 130*b* off. Alternatively, this control signal may be sent via serial data paths at terminals 3 and/or 4 to charger electronic control circuit 155 to turn off the charge FET 157 in the charger 150. However, it may still be possible to overcharge the battery pack 100 in the event of a two-point failure—a shorted semiconductor device 130*b* (charge control FET) in the battery pack 100 and improper unit behavior in one of the battery electronic control unit 125 or charger electronic control unit 155.

The dotted arrowhead lines in FIG. 4 show a hardware watchdog circuit 158 (hereafter watchdog 158) having multiple reset inputs. In addition to monitoring the charge current reset pulse, watchdog 158 also monitors the serial communications clock path (through terminal 3) as a reset pulse. If any of these reset pulses did not occur, the watchdog would timeout and turn the charge current off. It may still be possible to overcharge the battery pack 100 in the event of a 2 point failure—a shorted charge control FET (e.g., device 130*b*) in the battery pack 100 and improper unit behavior in one of the battery electronic control unit 125 or charger electronic control unit 155.

In addition to monitoring the charge current reset pulse, watchdog 158 also monitors the pack temperature at temperature sensor 120 (such as an NTC thermistor) directly to sense an overcharge condition. In FIG. 4, a shorted battery charge control FET (semiconductor device 130*b*) and any failures in the battery electronic control unit 125 or charger electronic control unit 155 would not affect the watchdog's 158 ability to monitor the pack temperature for sensing and terminating an overcharge condition.

In addition to monitoring the charge current reset pulse, watchdog 158 could also monitor the individual cell voltages using circuits 415A and terminal 6 to sense an over voltage condition which would indicate an overcharge condition. In FIG. 4, a shorted battery charge control FET (semiconductor device 130b) and any failures in the battery electronic control unit 125 or charger electronic control unit 155 would not affect the watchdog's 158 ability to monitor the individual cell voltages for sensing and terminating an overcharge condition.

In addition to controlling the hardware watchdog, the voltage monitor circuits 415A used for monitoring the individual cell voltages could also directly control the charge FET 130b in the battery pack 100 through the driver circuit 140 and/or directly control the charge FET in the charger (157) through the AND logic (151) and terminal 6. This is shown by the dotted lines between voltage monitor circuits 415A and driver circuit 140. This control would allow circuits 415A to stop an overcharge condition due to overvoltage of the individual cells.

In addition to monitoring the charge current reset pulse, watchdog 158 could also monitor the battery stack voltage using voltage monitor circuit 415B and terminal 7 to sense an overvoltage condition which would indicate an overcharge condition. In FIG. 4, a shorted battery charge control FET (semiconductor device 130b) and any failures in the battery electronic control unit 125 or charger electronic control unit 155 would not affect the watchdog's 158 ability to monitor the battery stack voltage for sensing and terminating an overcharge condition.

In addition to controlling the hardware watchdog, voltage monitor circuit 415B used for monitoring the battery stack voltage could also directly control the charge FET in the battery (130b) (see optional dotted line 425) through the driver circuit (140) and/or directly control the charge FET in the charger (157) through the AND logic (151) and terminal (7). This control would allow voltage monitor circuit 415B to stop an overcharge condition due to overvoltage of the entire battery stack voltage.

Figure 5:
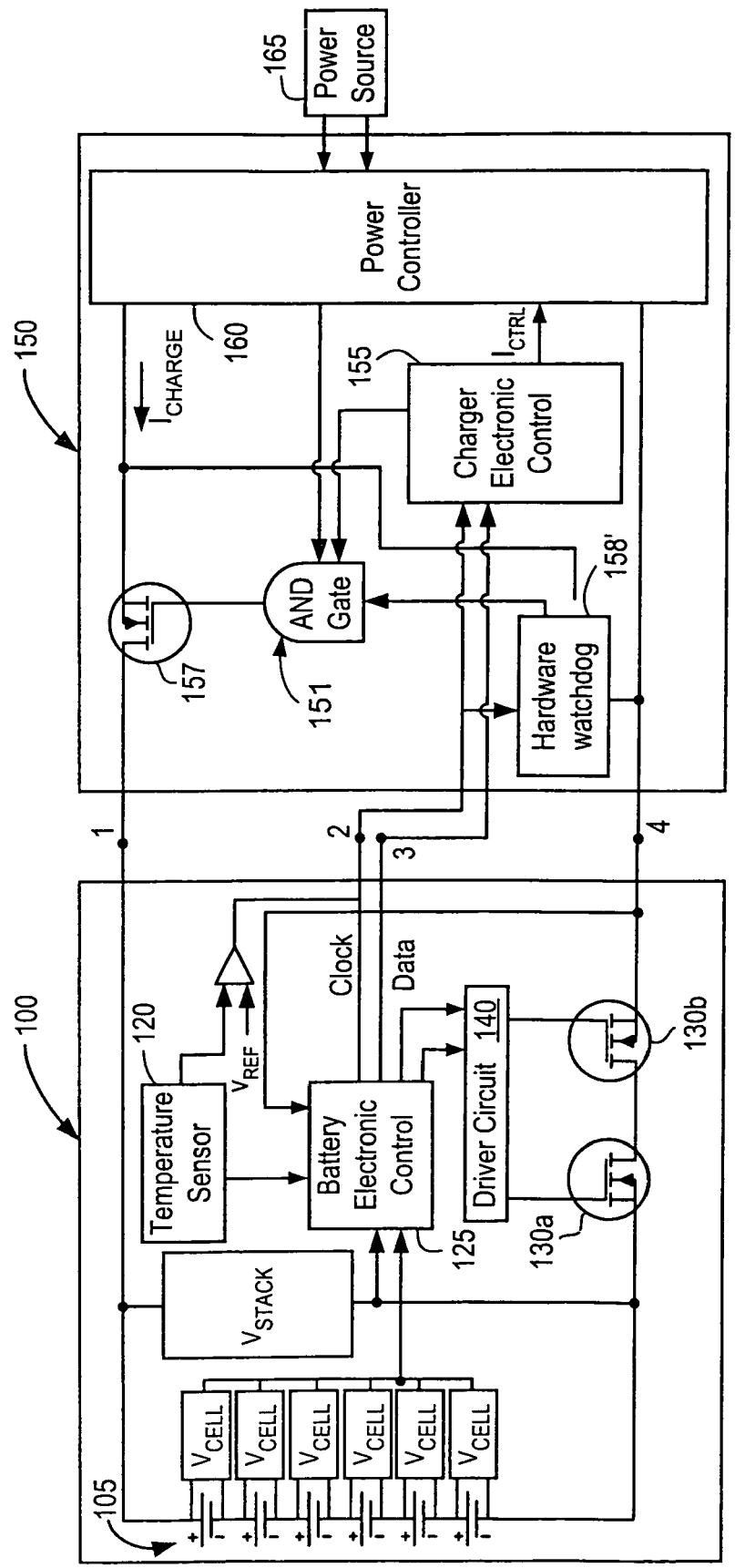
FIG. 5 is a partial block diagram of connections between a battery pack and charger to illustrate over-charge protection in accordance with another exemplary embodiment of the present invention.

FIG. 5 is a partial block diagram of connections between a battery pack and charger of a cordless power tool system to illustrate over-charge protection in accordance with another exemplary embodiment of the present invention. FIG. 5 omits the voltage monitor circuits 415A and 415B for purposes of clarity, it being understood that both individual cell voltage and total stack voltage could be inputs to a hardware watchdog circuit 158' in FIG. 5, similar to as shown in FIG. 4.

FIG. 5 is a hybrid of FIG. 4 to illustrate a watchdog 158' with multiple inputs. Watchdog 158' monitors the charge reset pulse, clock reset pulse, and the NTC signal, cell voltage, and/or battery stack voltage in order to sense a charge lock-on condition. The charge current could still be shut off even with a shorted charge control FET 130b in the battery and improper unit behavior in one of the battery electronic control unit 125 or charger electronic control unit 155, and may reduce the number of terminals needed by sharing the NTC output terminal with the clock terminal. Accordingly, the exemplary hardware watchdog circuit(s) in FIGS. 4 and 5 may prevent battery overcharging by monitoring the condition of both the battery pack 100 and charger 150. Overcharge prevention remains available even in the event of a two-point failure such as a shorted battery charge FET and improper microprocessor behavior in one (or both) of the battery pack 100 and charger 150.

Determination of an over-charge fault condition can also be done by other means. If an accurate current measurement is made by a current sensor in the battery pack (such as current sensor 145) during discharge, then a coulomb measurement could be made by the battery electronic control unit 125 to put back in the amount of energy taken out. This could be used in conjunction with or without the voltage measurement that may be made by a protection circuit 210 in the battery pack 100 to detect an over-charge fault condition.

Over-Discharge Protection

Various battery technologies can be damaged when discharged in excess of the manufacturer's recommendations. In accordance with the exemplary embodiments, the battery pack 100, such as is shown above in FIG. 3A or 3B, may include circuitry to prevent current flow when the battery voltage drops below a given voltage threshold, hence under-voltage lockout. A protection circuit 210 in the battery pack can sense battery voltage and if the voltage drops below a given voltage level, the discharge FET (semiconductor device 130a) is turned off. Battery cells 105 would still be susceptible to charge, but would not discharge any more. The threshold may be an absolute threshold set at time of manufacture, for example, or a threshold that may vary based on a number of given factors.

Figure 6:
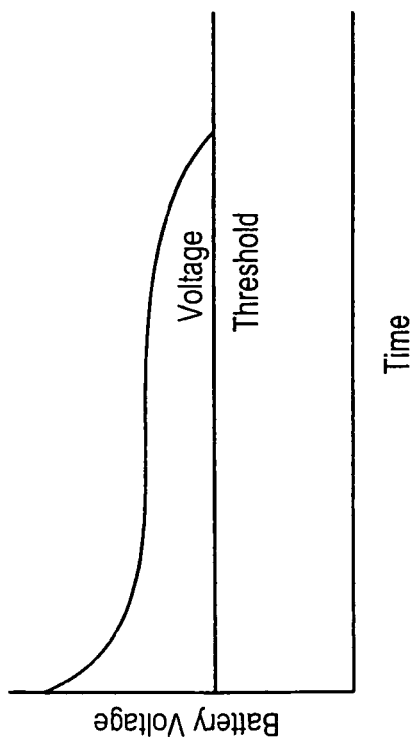
FIG. 6 is a graph of voltage versus time to illustrate an automatic shutdown for over-discharge protection invoked by a protection circuit in accordance with an exemplary embodiment of the present invention.

FIG. 6 is a graph of voltage versus time to illustrate an automatic shutdown invoked by a protection circuit in accordance with an exemplary embodiment of the present invention. To protect against an over-discharge fault condition in a battery pack of a cordless power tool system, an exemplary protection circuit 210 (such as shown in FIG. 2) and/or the battery electronic control 125 in FIGS. 3A-5, could perform an automatic shutdown of current in pack 100 if the voltage reached a given threshold.

An improvement to the aforementioned voltage threshold may be to combine the threshold with a proportion of discharge current to compensate for the impedance of the battery pack 100. Basing the threshold on an absolute level and subtracting a portion of the instant current may provide an alternative method for under-voltage lockout.

Figure 7:
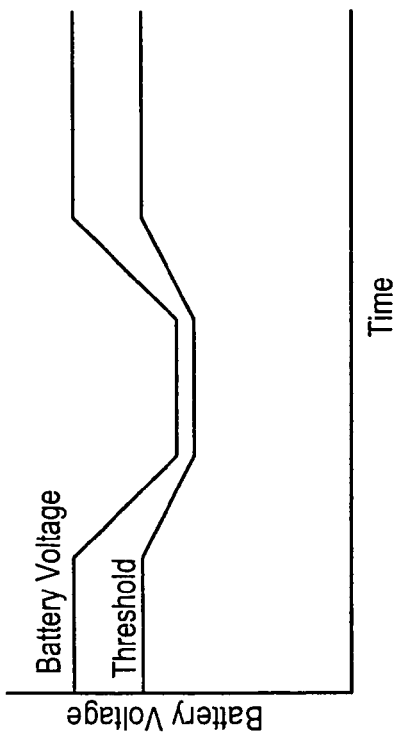
FIG. 7 is a graph of voltage versus time to illustrate a modified threshold for over-discharge protection in accordance with an exemplary embodiment of the present invention.

FIG. 7 is a graph of voltage versus time to illustrate a modified threshold for over-discharge protection in accordance with an exemplary embodiment of the present invention. For the purposes of describing FIG. 7, the protection current 210 of FIG. 2 or the battery electronic control 125 could be configured to make the following calculations and/or perform the automatic shutdown. FIG. 7 shows an example of a battery pack at 10% state-of-charge. By adding in a proportion of discharge current to compensate for the impedance of the battery pack 100, the battery pack 100 is still above a given discharge threshold of 2.7 volts.

For example, if a 10 amp pulse load is placed on the battery pack 100, the battery impedance would cause the voltage to jump below the threshold momentarily and return to its resting value when the current pulse is removed. Even though the battery pack 100 had 10% of charge left, a protection current would have interrupted current flow. However, if the low-voltage threshold was partially compensated with current as described in the previous paragraph, the threshold would be dropped during the heavy current draw and no shutdown would occur. In other words, the low-voltage threshold may be varied by subtracting a portion of the instantaneous discharge current to compensate for pack impedance so as to avoid an unwanted automatic shutdown.

Once the impedance of the pack is known, then the portion of the low-voltage threshold related to current can be calculated. Additional battery factors that may influence the low voltage threshold may include battery temperature, battery age, rate of decrease in battery voltage, etc.

Over-current Protection

Figure 8B:
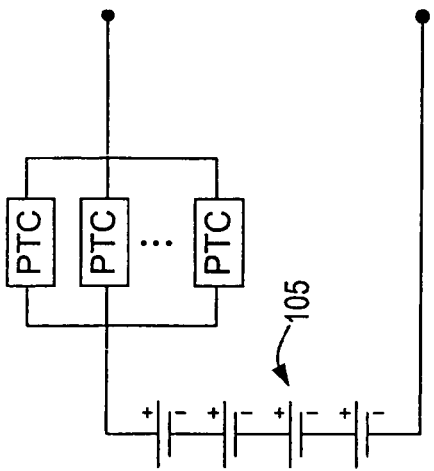
FIGS. 8A and 8B illustrate exemplary devices used for over-current protection in accordance with an exemplary embodiment of the present invention.
Figure 8A:
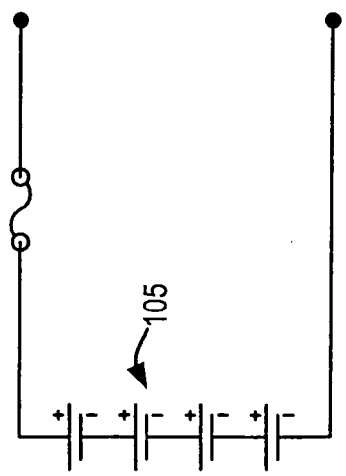

FIGS. 8A and 8B illustrate exemplary devices that may be used in the battery pack for over-current protection in accordance with an exemplary embodiment of the present invention. FIGS. 8A and 8B illustrate only a portion of a battery pack circuit for reasons of brevity. However, the devices in FIGS. 8A and 8B could be part of the battery pack 100 as shown in any of FIGS. 3A-5. Another mechanism that can cause cell damage is over-current. Various electronic switching methods may have a drawback, in that electronic switches are prone to failing in a short circuit condition. When this happens, an operator overload the motor of the attached tool. For battery pack circuit designs that include separate impedance branches, a device such as a fuse or fusible link could be used to limit the maximum current through that circuit branch.

Fuses generally are not designed to provide overload protection, as a fuse's basic function is to protect against short circuits. However, a dual-element (two-element) fuse or time delay fuse may provide secondary motor overload protection, although when blown must be replaced, as these fuses are nonrenewable. Accordingly, such a fuse could represent a secondary failure and be intended to prevent further operation, for example.

Thus, a simple fuse as shown in FIG. 8A may be designed to limit the current through the cells 105, but may also cause permanent damage once its rating is exceeded. Other devices such as Positive Temperature Coefficient (PTC) elements and re-settable fuses may be substituted for the fuse in FIG. 8A for over-current protection. As discussed above, PTC devices or elements are known as protective elements for controlling the current which flows through circuits to be protected, since their resistance value increases as they give off heat in over-current conditions. For example, PTC thermistors have been used as an over-current protection element. When an electronic circuit gets overloaded, conductive polymers of a PTC thermistor, which have PTC properties, emit heat and thermally expand to become high resistance, thereby reducing the current in the circuit to a safe, relatively small current level.

Accordingly, if a PTC device such as described above is connected in series with the battery, the total pack impedance would increase with increasing current. If substantially low impedance is needed and no commercially available single PTC device can offer the desired low impedance and/or current capability, then multiple PTC's could be connected in parallel with each other to share the current, as shown in FIG. 8B, for example.

If separate charge and discharge paths or branches are envisioned in the battery pack, then a thermal fuse such as a PTC element could be placed on each current path. This would be beneficial in that the charge path would use a low current device and the discharge path would use a high current device.

Proximity placement of a fuse nearer the terminals also may provide an added benefit of isolating the downstream branch of electrical devices from a non-isolated charger. If a battery pack 100 were to melt sufficiently to expose the cells 105 and electronics, the fuses (which would have blown) near the terminals would provide a disconnect of the exposed metal from the non-isolated charger output, hence electric isolation to possible preserve electrical components in an attached charger (or tool). Thus, positioning the fuse (or PTC element) in FIG. 8A nearer the terminal may provide additional over-current protection in pack 100.

Using current sensing measures (such as current sensor 145 of FIGS. 3A and 3B) and a semiconductor device (such as semiconductor devices 130a and 130b) to stop current flow once an over-current threshold is reached may be a desirable method of preventing cell-damage. For example, current sensor 145 may be adapted to sense pack current to generate a control signal based on sensed current exceeding a given current limit or threshold. A semiconductor device having a current limiting or current interrupting function (e.g., semiconductor devices 130a and 130b) may be directly connected to the current sensor 145. The semiconductor device may be adapted to limit or interrupt current based on the control signal received directly from the current sensor 145 instead of from battery electronic control 125 via driver 140.

Current sensing could also be coupled with an averaging algorithm if momentarily high current loads were acceptable but steady state high current was not acceptable. A suitable current limit or threshold could also be variable, and proportional, to the temperature of the cells. This may be beneficial in that, if the cells were already hot, the-maximum current pulled out would not be sufficient to overheat the internal cell chemistry.

Over-temperature Protection

Some batteries may also be damaged by extreme temperatures (extreme high or low temperatures) or have reduced performance (i.e., reduced voltage and/or current output) due to extreme temperatures. This is particularly relevant to battery packs having a Li-ion cell chemistry. A battery temperature threshold may be set to shutdown the battery pack until it cools below a desired or given temperature. Likewise, a battery temperature threshold may be set to shutdown the battery pack until it rises above a desired or given temperature. These thresholds can also be based on a set limit with a partial dependence on current, voltage, age, and rate of rise or fall in temperature, for example. As discussed above, one or more temperature sensors may be used for determining the state of the battery pack temperature.

Figure 9:
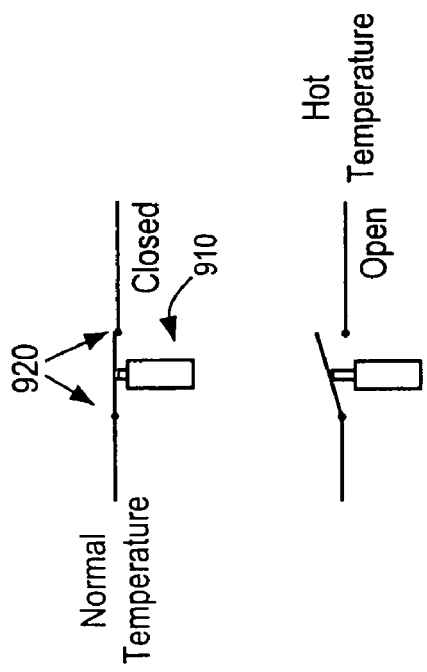
FIG. 9 illustrates a device providing over-temperature protection in accordance with the exemplary embodiments of the present invention.

FIG. 9 illustrates a device providing over-temperature protection in accordance with the exemplary embodiments of the present invention. An over-temperature fault condition in a battery cell may cause permanent damage. Thus, a protection circuit configured to monitor absolute temperature may be useful in preventing over-temperature conditions. FIG. 9 illustrates only a portion of a battery pack circuit for reasons of brevity. However, the devices in FIG. 9 could be part of the battery pack 100 as shown in any of FIGS. 3A-5.

As shown in FIG. 9, the protection device 210 may be embodied as a thermal switch 910 that opens high current contacts 920. These contacts may be located within the circuit to stop any current flow in or out of the pack 100 until the temperature drops to an acceptable level. These devices may be typically set to trip at a pre-determined temperature and are usually found in coffee makers, for example. Once the water in a coffee maker is boiled off the heating element temperature rises above 212° F. The temperature switch senses this and breaks the temperature controlled switch. When the pack (or a cell) temperature gets too hot, the charge and/or discharge function in pack 100 is disabled.

Alternatively, a thermally controlled release mechanism could 'pop' the battery pack 100 out of the tool 170 or charger 150 and prevent re-insertion, until the pack 100 has cooled off. This device could be similar to a "pop-up timer" aimed at a latch mechanism which restrains an ejection device within pack 100, as will be seen in further detail below. Another device for protecting against an over-temperature fault condition is the use of a thermistor. A thermistor may be utilized in the battery pack 100 to monitor temperature conditions while maintaining full electrical isolation of the thermistor from the battery cells 105.

Currently, manufacturers typically may include a thermistor in battery packs to monitor the temperature of the core pack and to terminate charge in the event of an over temperature condition. These thermistors have a connection arrangement in which one end is connected to a terminal going out to the charger 150, and the other end is referenced to ground by tying to the negative terminal lead in the battery pack.

For high power battery packs adapted for use with both existing cordless power tools, and developing lines of power tools that are manufactured for use with these high power battery packs, such as Li-ion battery packs, this above connection arrangement may be problematic, since the connection arrangement creates the potential for a charge path through the thermistor. If a small amount of current were passed through the thermistor, the battery pack could potentially be charged outside the protection controls and circuitry provided in the pack 100 and charger 150. This could potentially lead to an inadvertent overcharging of the pack 100, a potentially hazardous condition.

Figure 10:
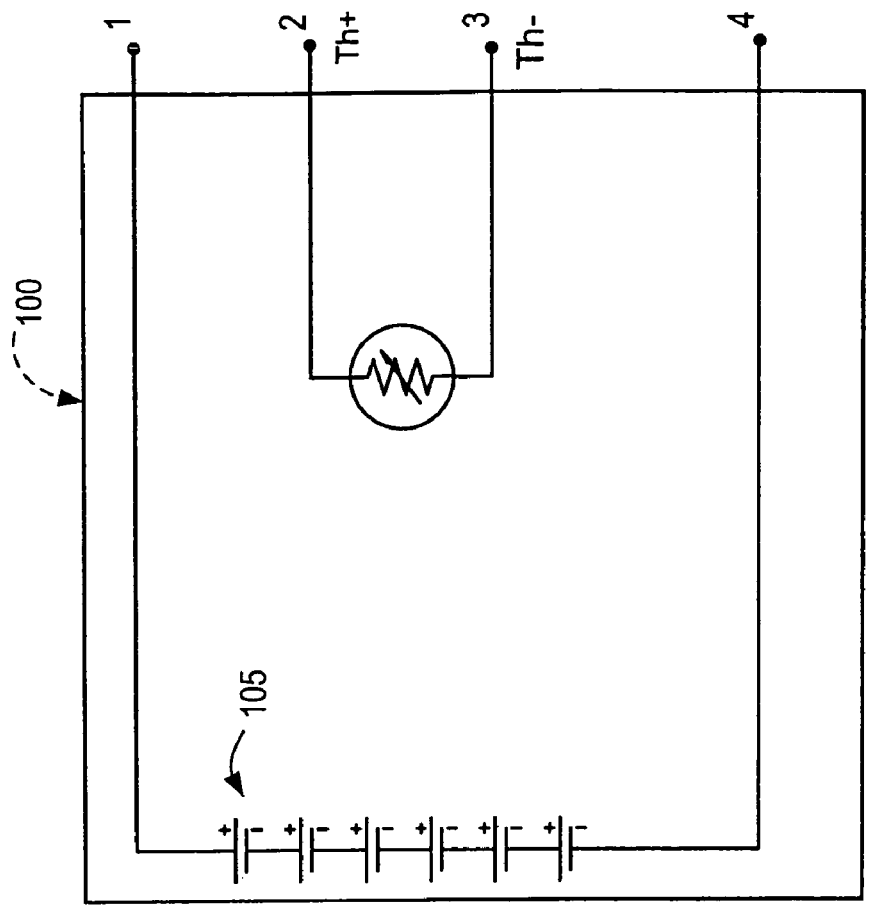
FIG. 10 illustrates a connection arrangement for a thermistor in accordance with an exemplary embodiment of the present invention.

FIG. 10 illustrates a connection arrangement for a thermistor in accordance with an exemplary embodiment of the present invention. In FIG. 10, only the positive and negative terminals of the pack 100 are shown for clarity. FIG. 10 illustrates only a portion of a battery pack circuit for reasons of brevity. However, the thermistor in FIG. 10 could be part of the battery pack 100 as shown in any of FIGS. 3A-5. The two leads of the thermistor (Th+ and Th−) may be brought out of the pack on independent terminals 2 and 3. These terminals may interface to temperature monitoring circuitry inside of the charger 150, for example, such as temperature monitoring circuitry of the charger electronic control unit 155 (not shown in FIG. 10 for clarity). This may allow monitoring of pack 100 temperature while keeping the thermistor completely isolated from the charge path in the pack 100. By doing this, there is no charge path through the thermistor and no potential to overcharge the battery pack 100 through the thermistor.

Audible/Visual Warning Mechanisms

Before shutting down the battery power, it may be desirable that some kind of warning be provided to the operator of a cordless tool powered by the attached battery pack. Similar to a scenario when a fault condition occurs, or is in the process of occurring, in an owner's car, the owner may be given a warning light on the dashboard for a given duration of time before the engine breaks down because of the fault condition (i.e., piston damage due to a lack of oil).

Both under-voltage and temperature limitations can be used as a cut-off, i.e., the battery pack 100 ceases to output current once a threshold is reached. However, before such a fault condition occurs (such as an under-voltage or over temperature threshold) is reached, a warning mechanism in either the battery pack or tool may warn the operator that the operator is approaching an impending operating limit in the pack that may automatically shutdown battery power in the pack. The warning mechanism could be audible (with a horn or buzzer) or visible using a desired illumination scheme such as LEDs, for example.

The audible and/or visible warning mechanism may be tied into the existing circuitry in the pack 100 or too 170. As discussed above, the battery pack 100, tool 170 or charger 150 in any of FIGS. 3A through 5 and may be controlled by intelligence in the pack, tool, charger, etc. Such intelligence as battery electronic control 125 or tool electronic control 180 could be configured to control warning mechanisms for various impending or present fault conditions. As an example, a separate audible or visual warning may be provided to alert the tool operator of an over-discharge condition in the battery pack 100, an over-current condition in the battery pack 100, and over-temperature condition in the pack 100 or in the motor 190 of the attached tool 170, and/or an under-voltage condition in the battery pack 100 due to an excessive amount of current being drawn from the battery pack 100.

As discussed above, the warning mechanism before an impending automatic battery power shutdown is reached could be embodied in many different forms. The aforementioned audible warnings such as horns, buzzers, and speaker sounds might be acceptable in some working environments, but may not be heard by the tool operator in loud environments. Visual cues such as specified illumination(s) and gauges may also be missed by the tool operator in extremely dark or substantially bright work areas.

An alternative warning mechanism to alert the tool operator may be embodied in the motor control of the tool motor. In general, an electronic circuit in one of the tool or battery pack could reduce the maximum power output capability of the battery pack and produce a "fold back" condition. The operator would both hear and feel this condition as a 'weakening' of the tool performance. The operator would be prompted to back off and avoid an impending fault condition (e.g., under-voltage, over-temperature, under-temperature condition, etc.).

An additional method for alerting the user of an impending fault condition would be to vary the motor control's pulse width modulation (PWM) to create a "warble" effect in the speed of the motor. This mild cyclic change in motor speed is selected as such it would not adversely affect tool performance. This method provides the user with both audible and tactile feedback on the impending fault condition.

A third method for alerting the user of an impending fault condition would be to lower the PWM frequency into the audible frequency range and vary the pitch in a periodic fashion. This will present an efficient warning mechanism to get the operator's attention. At the very least, the warning mechanism gives the operator a sense of warning that they may be able to finish the current job, but may not be able to move on to another job before resting or recharging the battery pack to eliminate or overcome the impending fault condition.

Any of the above warning mechanisms, either singly or in combination with one or more of the above warning mechanisms, could potentially enhance the tool functionality or extend tool and/or battery pack life. The following details the latter warning mechanism as directed to providing the aforementioned warbling effect in the motor of the power tool based on a state of charge in the battery pack.

PWM State of Charge (SOC) Indicator

The purpose of the PWM State of Charge (SOC) Indicator is to alert the operator of an impending fault condition which could cause automatic battery power shutdown, resulting in a 'dead' battery pack. This may be accomplished by directly determining SOC information in a motor control unit that is part of the battery pack circuitry. Based on the SOC information, a motor control unit in the battery pack would vary the motor current switching frequency to produce the 'warbling effect' in the tool motor that may be heard and/or physically felt by the tool operator.

Figure 11:
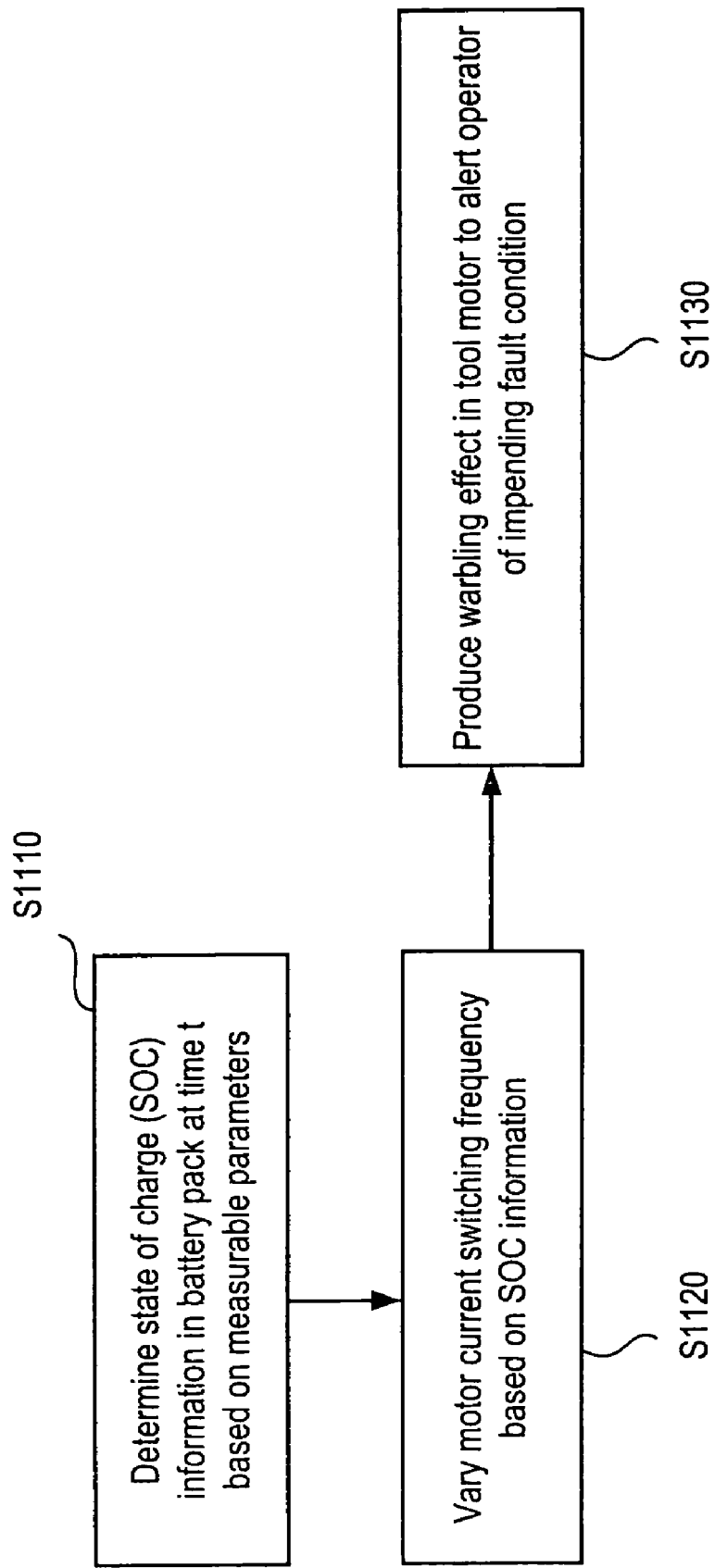
FIG. 11 is a flow diagram illustrating a method of alerting an operator of a power tool of an impending fault condition in the battery pack.

FIG. 11 is a flow diagram illustrating a method of alerting an operator of a power tool of an impending fault condition in the battery pack. Referring to FIG. 11, a motor control unit (not shown) in the battery pack may measure various battery pack parameters to determine state of charge (SOC) information in the battery pack at a given time instant (S1110). The motor control unit may be embodied in hardware or software as a digital microcontroller or microprocessor or an analog circuit, for example, and/or by a digital IC such as a digital signal processor or an application specific integrated circuit (ASIC). Based on the SOC information, the motor control unit determines a desired motor current switching frequency (S1120) which is imparted to the tool motor to produce the warbling effect (S1130) to alert the operator.

There are a number of ways to evaluate, track and determine the SOC of the battery pack. For example, battery pack parameters measured by the motor control unit to determine the SOC information may include battery pack voltage, Coulomb count ($Ah_{in} - Ah_{out}$), total battery pack 100 impedance, etc. The motor control unit would then decide on a motor current switching frequency based on the SOC information.

The motor current switching frequency for the tool 170 motor could be manipulated in a number of ways to alert the user. Accordingly, adjusting the motor current switching frequency enables the motor of the tool to communicate to the tool operator. A switching frequency could be selected in the audible frequency range, so that the motor would make a noise that is perceptible by the operator. Exemplary audible frequencies could be a constant frequency tone emitted by the tool motor, a varying frequency ring tone, a complex series of multiple frequency tones to mimic a 'voice' speaking to the tool operator, for example. Additionally, the motor control unit could pulse the motor so as to make the tool physically shutter or vibrate in a way that would let the operator know that the battery packing was running out of charge, for example, or approaching a fault condition requiring attention.

Methods of pulse-width-modulating the motor to alert the operator of an impending fault condition such as a low SOC condition could also be used to communicate other fault conditions. For example, motor current switching frequency could be adjusted to alert the tool operator based on sensed information related to an over temperature condition in the battery pack, over temperature condition in the tool motor, over-current condition in the pack and/or under-voltage condition due to an excessive amount of current being drawn from the battery pack. Current, temperature and voltage are merely exemplary measurable parameters that could be tracked for a given fault condition.

Figure 12:
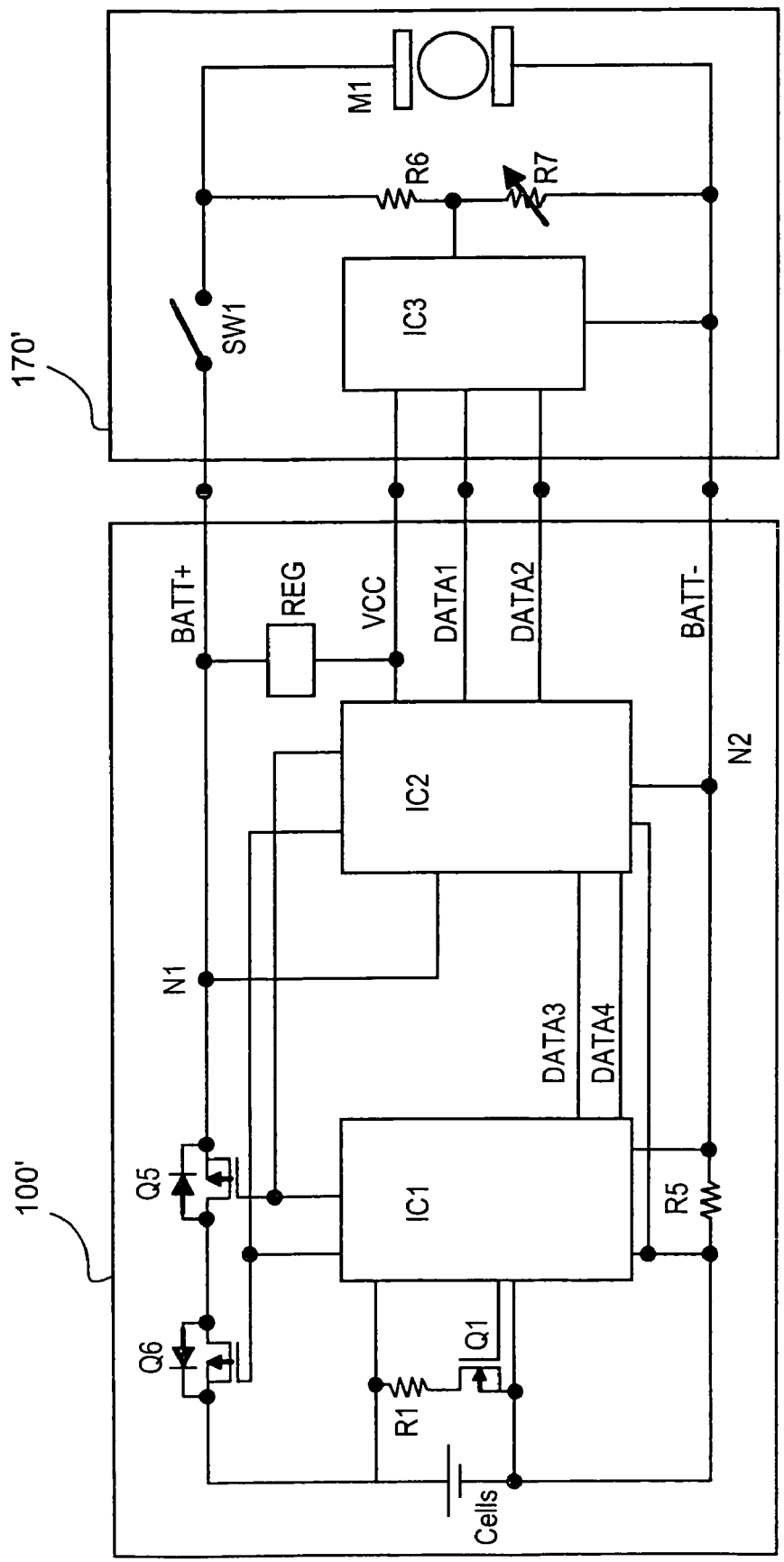
FIG. 12 is a block diagram illustrating an exemplary arrangement for determining SOC and varying motor current switching frequency in accordance with an exemplary embodiment of the present invention.

FIG. 12 is a block diagram illustrating an exemplary arrangement for determining SOC and varying motor current switching frequency in accordance with an exemplary embodiment of the present invention. FIG. 12 shows a circuit interface relationship between battery pack 100' and tool 170' somewhat similar to FIG. 3B, although only certain components are shown for reasons of clarity.

Referring to FIG. 12, IC1, R1, and Q1 contribute to protection circuitry and cell balancing functionality, as discussed above in reference to several of the other figures. IC1 could represent the battery pack electronic control unit 125, for example, in FIGS. 3A and 3B. DATA3 and DATA4 represent serial data paths to carry serial data between IC1 and IC2; IC2 in FIG. 12 may represent the motor control unit. For example, DATA3 could be dedicated to passing data and control signals between IC1 and IC2, and DATA4 for sending a clock to synchronize IC1 with IC2 or vice versa.

The element REG is a voltage regulator that supplies VCC to digital devices IC2 and IC3. In FIG. 14, IC3 may represent a tool electronic control unit 180 as described in FIG. 3B for example, with DATA1 and DATA2 representing serial data paths for communication of data and control signals between IC3 and IC2. SW1 represents the tool switch to pull current from the battery pack to power motor M1. Resistor R6 and potentiometer R7 make up a variable speed input for the tool. Each of IC1, IC2 and IC3 may be embodied in hardware or software as a digital microcontroller or microprocessor or an analog circuit, for example, and/or by a digital IC such as a digital signal processor or an application specific integrated circuit (ASIC)

Motor control unit IC2 drives the gates of Q5 and Q6 (which may be embodied as MOSFETs) in order to regulate output voltage of the battery pack and thereby control motor current that powers the motor M1 of the tool. IC2 may measure one of more battery pack parameters to determine SOC. For example, IC2 could monitor battery pack output voltage across nodes N1 and N2, or perform Coulomb counting by monitoring current at shunt resistor R5 and keeping track of time (via suitable internal clock). Further, IC2 could also monitor pack impedance by subtracting loaded battery pack output voltage (when current is flowing) from unloaded pack voltage (recorded before current draw) and dividing the result by the current measurement taken at R5. Any of these measurable parameters could serve as a SOC measure. IC2 would then use this SOC information to determine the appropriate switching frequency, and control Q5 and Q6 to achieve that switching frequency.

Redundancy

The features described above are designed to prevent damage to the battery cells from heavy use or failing components in any part of the control system in the pack 100, charger 150 or tool 170. By adding a secondary form of redundancy, the cells may be less likely to experience cell damage. For example, in FIG. 12, the charger 150 and the tool 170 could also monitor battery temperature and current through external terminals or communications. Battery voltage may also be monitored during charge by the charger 150. It could also be checked by the tool during discharge.

FIGS. 13-16, in general, illustrate various devices for providing overcharge protection in extreme cases. In the event that an overcharge condition fails to be addressed by the above described watchdog circuit of FIGS. 4 and 5, other current sensory devices, and/or an intelligent device microprocessor in one or more of the battery pack 100 or charger 150 fails (multi-point failures in pack or charger), FIGS. 13-16 illustrate potential secondary protection for the battery pack 100 and/or charger 150.

Figure 13B:
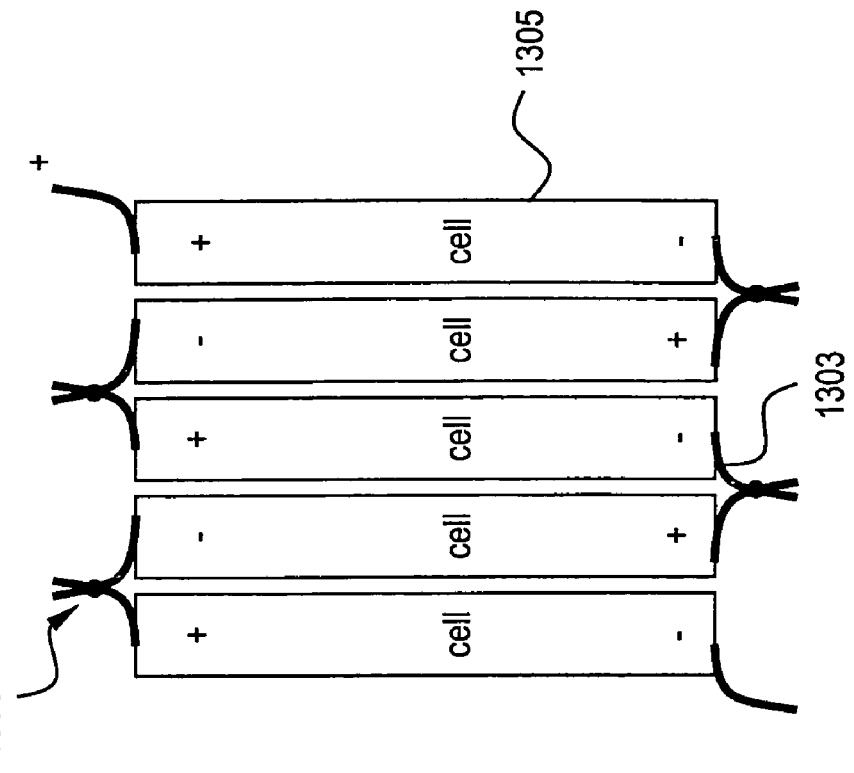
Figure 13A:
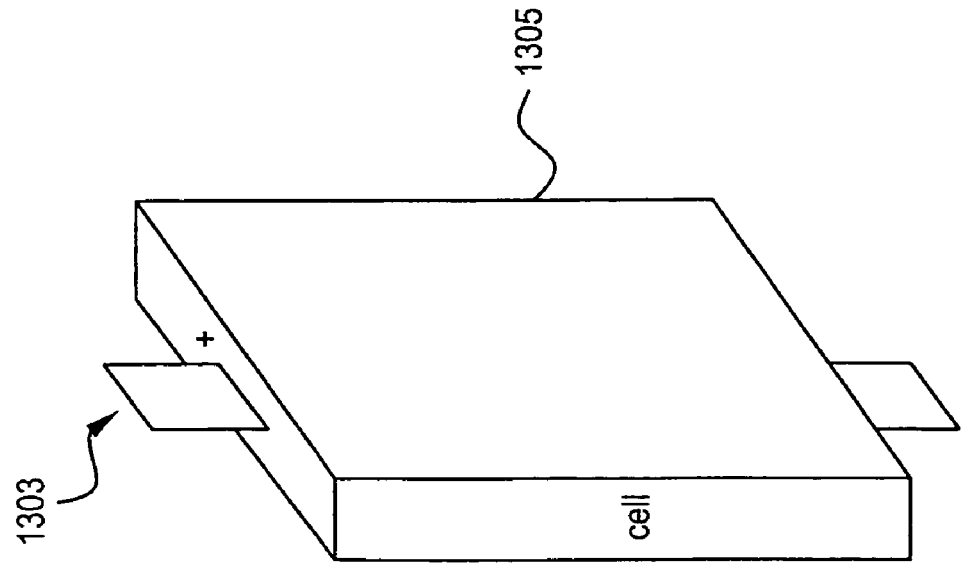
FIG. 13A is an isometric view of a single laminate battery cell.

FIG. 13A is an isometric view of a single laminate battery cell, in which cell 1305 (analogous to cell 105 in any of FIGS. 3A-5) has a tab 1303 (also known as a connector) for connection to an adjacent serially connected cell. FIGS. 13B and 13C illustrate a device for protecting against an overcharge condition in accordance with an exemplary embodiment of the present invention.

FIGS. 13B and 13C illustrate a device which may reduce the potential for battery cells having a lithium-ion cell chemistry (or other cell chemistries) from rupturing upon a severe overcharge condition that is unattended by other protection circuitry in the pack. In general, during an overcharge event, the laminated lithium-ion battery cells 1305 may exhibit extensive swelling. If the overcharge continues, this may result in a rupture of one or more of the cells 1305. This rupture may result in fire and potentially severe damage to the battery pack 100 attached electrical device (charger 150, tool 170) and/or user of the battery pack 100.

Accordingly, a battery pack may be designed to take advantage of this swelling phenomenon. FIG. 13B a side view of a steady-state or normal condition in the battery pack, and illustrates tab welds 1306 or similar connections to serially connect the tabs 1303 of adjacent cells 1305 between positive and negative power terminals of the battery pack 100. As shown in FIG. 13C, swelling of one or more given cells 1305 in the battery pack 100 may help to prevent a severe overcharge condition from occurring. The swelling cell(s) 1305 creates a tension pressure against its tab 1303, such that two tabs 1303 may separate at a tab weld 1306. In this example, the an opening 1308 is formed in the circuit, thus removing or interrupting charge current to the cells 1305. Thus, as a cell 1305 expands, it pulls the tab connector 1303 away from an adjacent tab 1303 at the tab weld 1306 to break the electrical connection between cells 1305, interrupting current flow in the battery pack 100.

Figure 14B:
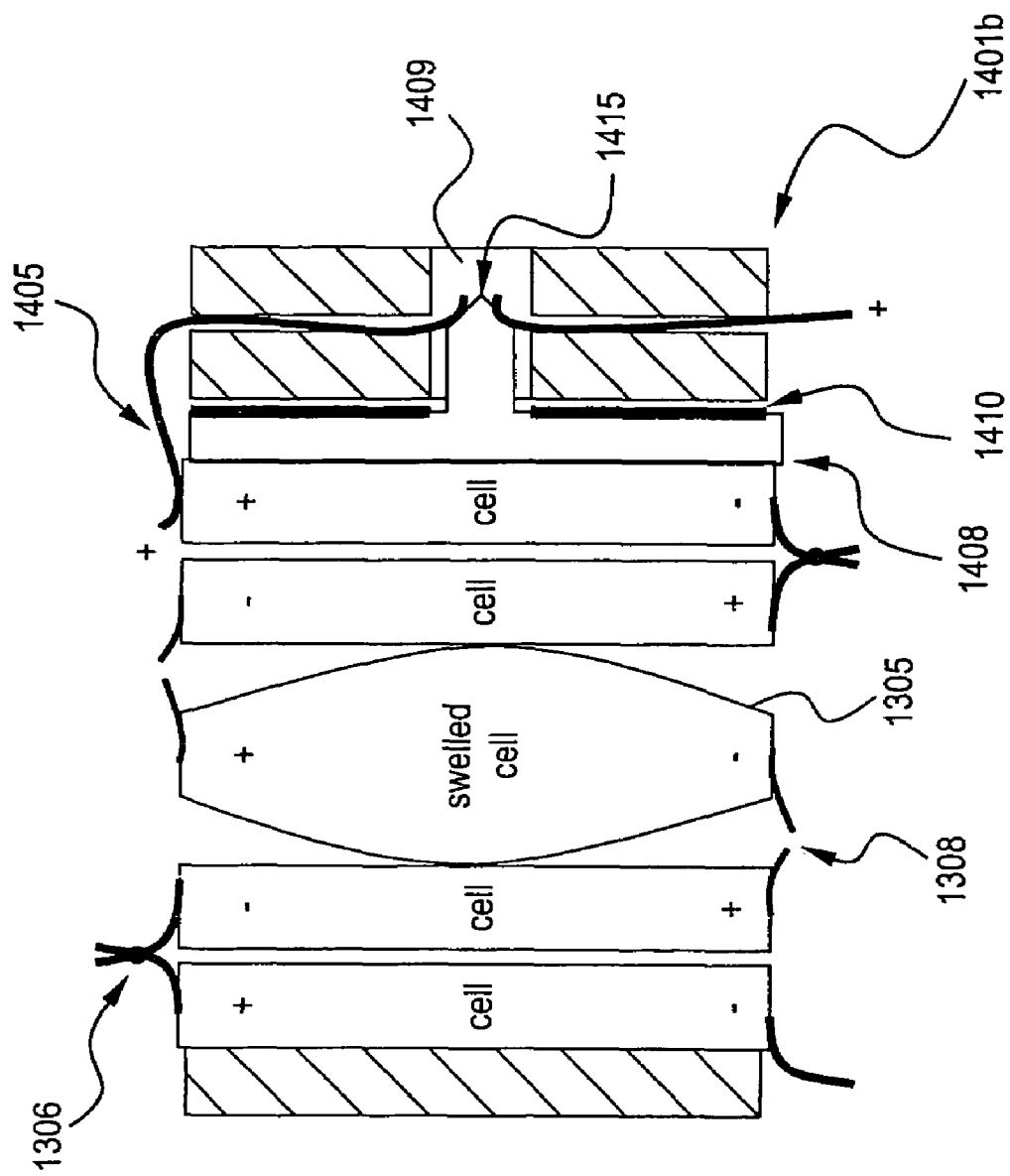

FIGS. 14A and 14B illustrate a device for protecting against an overcharge condition in accordance with another exemplary embodiment of the present invention. FIG. 14A illustrates a side view of normal or steady state conditions in pack 100 to illustrate another exemplary protection arrangement. In FIG. 14A, the cells 1305 may be serially arranged within a battery housing (shown generally as housing sidewall 1401a and housing sidewall 1401b, which may include an intermediate housing wall 1401c, for example. A plunger 1408 may be provided between the serially connected cells 1305 and the intermediate housing wall 1401c so as to protrude into a recess 1409 through the walls 1401b, 1401c. In an example, the plunger may be restrained via a counter force provided by spring 1410, so that there is a channel 1404 formed between housing sidewall 1401b and intermediate housing wall 1401c. A lead wire (here shown as a positive terminal wire or circuit trace), may extend through the channel 1404.

Referring now to FIG. 14B, showing one cell 1305 in an overcharged state. As the cell 1305 expands, the expansion force from the cell assists the plunger 1408 in overcoming the counterforce spring pressure from spring 1410. Thus, plunger 1408 travels into recess 1409 to sever lead wire 1405 as shown generally at 1415, thereby interrupting charge current to the cells 1405 of the battery pack. Note also that the swelling cell 1305 also causes the tabs 1303 to come apart as shown generally at 1308, providing further redundancy to sever or break the electrical connections internal to the battery pack. These protective features may thus prevent rupture of one or more cells in the pack 100 by interrupting the current flow.

Figure 15A:
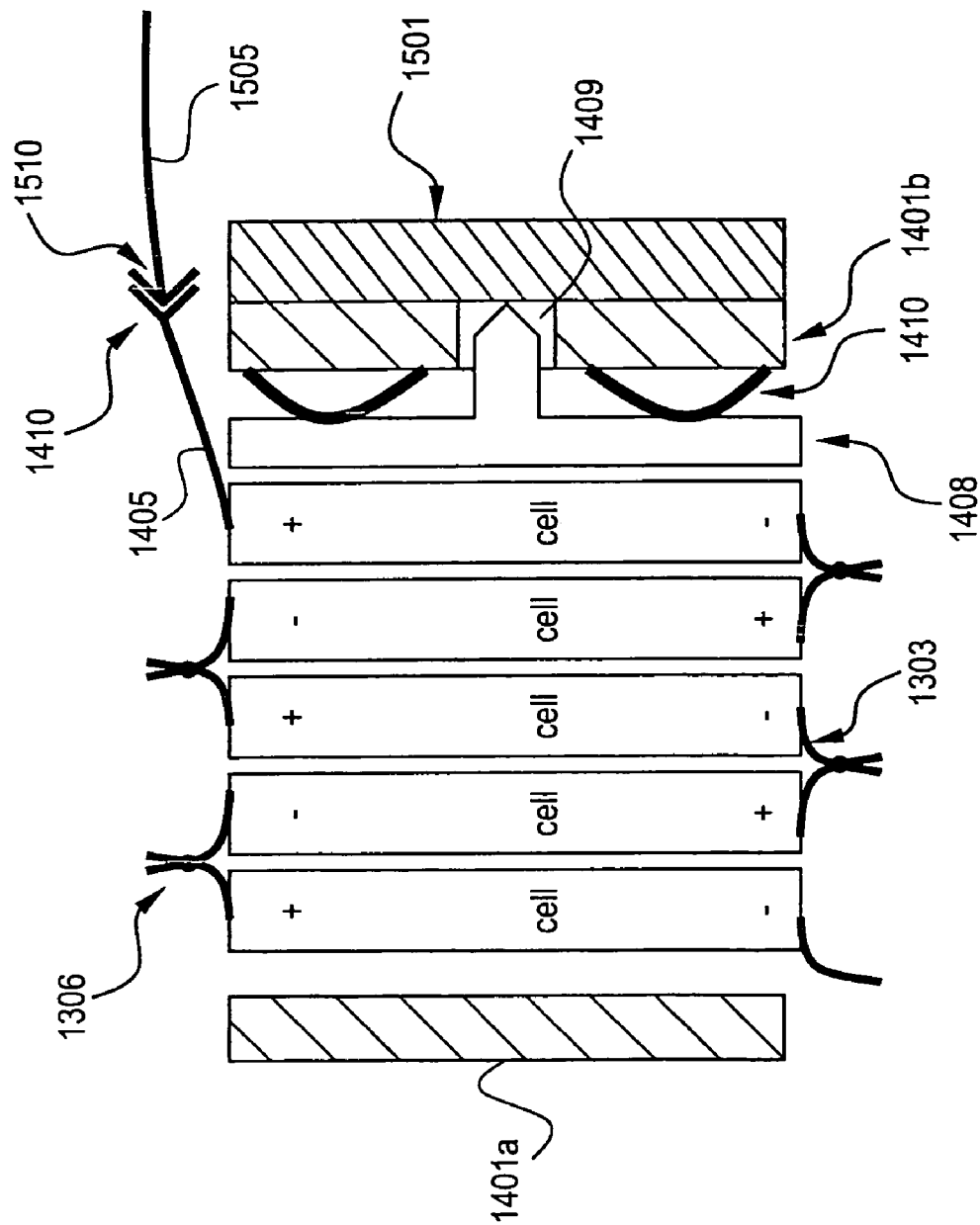
FIGS. 15A and 15B illustrate a device for protecting against an overcharge condition in accordance with another exemplary embodiment of the present invention.
Figure 15B:
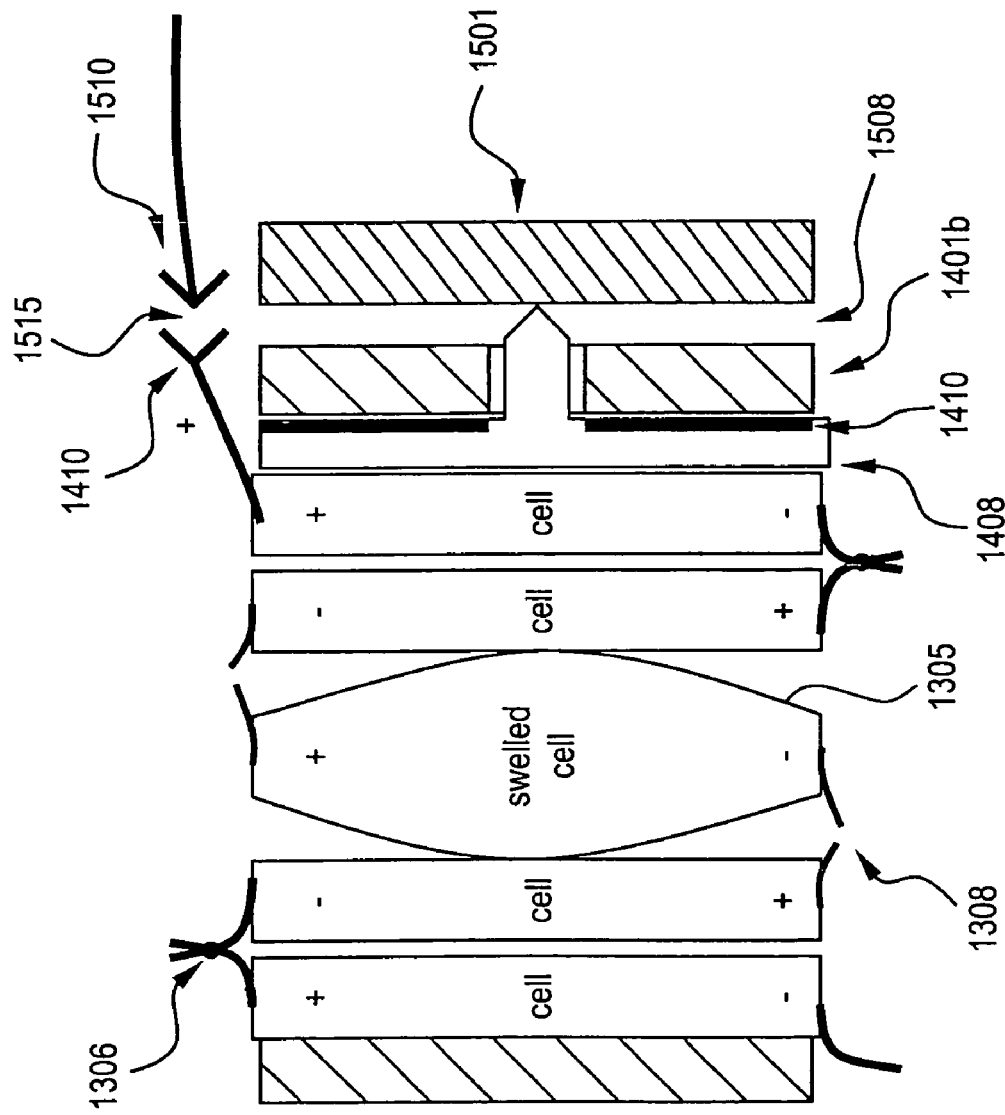

FIGS. 15A and 15B illustrate a device for protecting against an overcharge condition in accordance with another exemplary embodiment of the present invention. FIGS. 15A and 15B illustrate a plunger designed so as to eject a battery pack from a charger.

FIG. 15A is similar to FIG. 14A, thus only differences are discussed for reasons of brevity. As shown in FIG. 15A, in steady state or normal operations, plunger 1408 is biased against a counterforce spring pressure of spring 1410, such that the plunger 1408 rests against a charger housing sidewall 1501. Charger housing sidewall 1501 abuts sidewall 1401b of pack 100. Lead wire 1405 of the pack and a charger lead wire 1505 are operatively connected at contacts 1410, 1510.

Referring now to FIG. 15B, as a cell 1305 expands, plunger 1408 overcomes spring 1410 pressure which causes the plunger 1408 to self-eject the pack 100 from the charger, see gap 1508 between cell housing sidewall 1501 and pack sidewall 1401b. This action breaks contacts 1410 and 1510. Accordingly, upon a severe overcharge condition, the swelling of the pack in combination with the placement of the plunger 1408 interrupts charging current and prevents rupture of the pack by ejecting the pack from the charger. Note also that the swelling cell 1305 also causes the tabs 1303 to come apart as shown generally at 1308, providing further redundancy to sever or break the electrical connections internal to the battery pack. These protective features may thus prevent rupture of one or more cells in the pack 100 by interrupting the current flow.

Figure 16B:
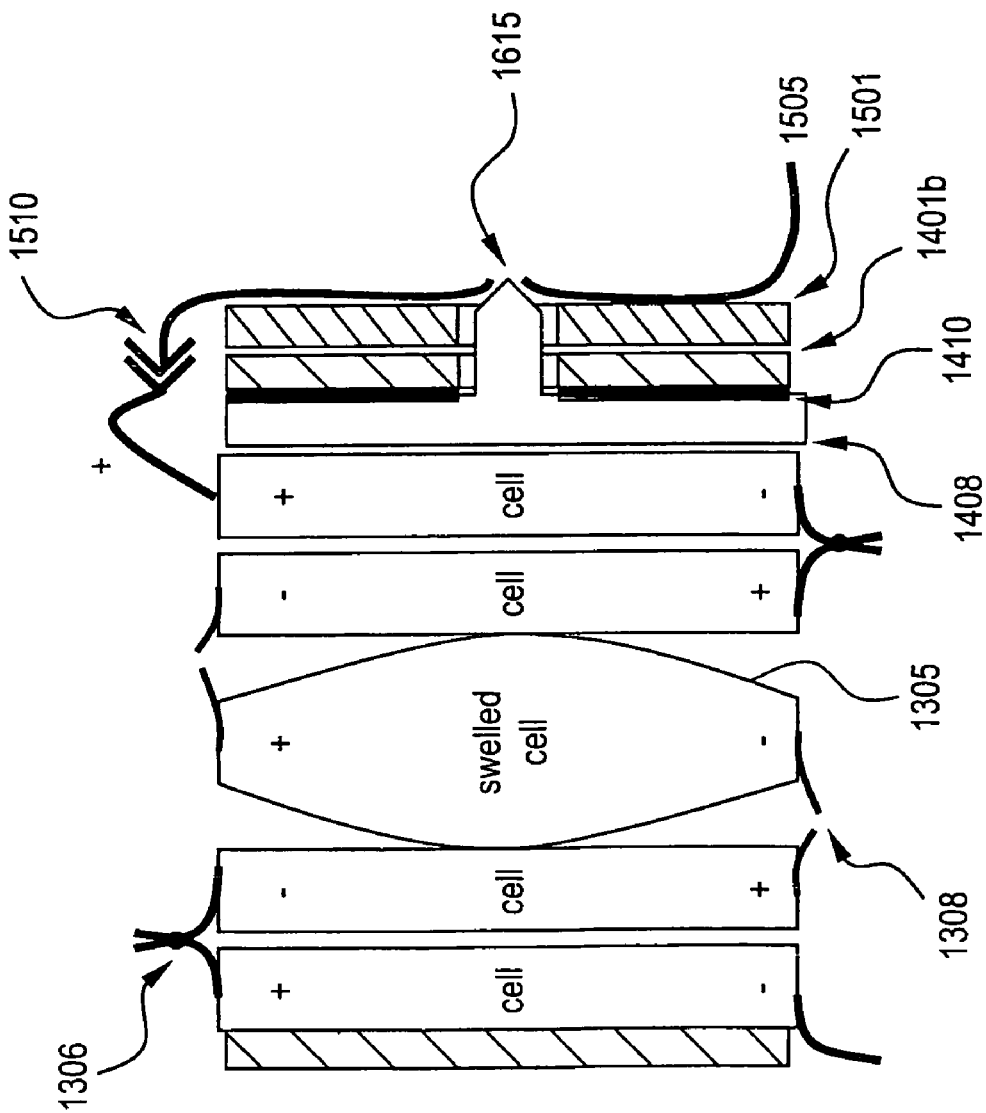

FIGS. 16A and 16B illustrate a device for protecting against an overcharge condition in accordance with another exemplary embodiment of the present invention. FIGS. 16A-B are similar in some respects to FIGS. 14A-14B, thus the differences are described for purposes of brevity.

In FIG. 16A, the charger lead wire or trace 1505 is connected to pack lead wire at contacts 1405, 1505. Unlike in FIG. 14A, charger lead wire 1505 abuts an inside surface a charger housing sidewall 1501. Plunger 1408 and spring 1410 are as described in FIG. 14A. Referring now to FIG. 16B, showing one cell 1305 in an overcharged state. As the cell 1305 expands, the expansion force from the cell assists the plunger 1408 in overcoming the counterforce spring pressure from spring 1410. Thus, plunger 1408 travels into recess 1409 to sever charger lead wire 1505 as shown generally at 1615, thereby interrupting charge current to the cells 1405 of the battery pack. Note also that the swelling cell 1305 also causes the tabs 1303 to come apart as shown generally at 1308, providing further redundancy to sever or break the electrical connections internal to the battery pack. These protective features may thus prevent rupture of one or more cells in the pack 100 by interrupting the current flow.

The exemplary embodiments of the present invention being thus described, it will be obvious that the same may be varied in many ways. Such variations are not to be regarded as departure from the spirit and scope of the exemplary embodiments of the present invention, and all such modifications as would be obvious to one skilled in the art are intended to be included within the scope of the following claims.

What is claimed is:

1. A battery pack having over-charge protection, comprising:
    a housing,
    a plurality of serially-connected cells therein, and
        wherein the cells are serially connected between power terminals of the pack and interconnected to each other via connectors, the connectors of adjacent cells connected to each other
    a current interrupt mechanism to interrupt current in the cells that is triggered upon swelling of at least one cell during an over-charge event, and
        wherein the current interrupt mechanism is embodied as at least one connector of a swelling cell being pulled apart from at least one connector of an adjacent cell to interrupt current.

2. The battery pack of claim 1, wherein the current interrupt mechanism comprises:
    a plunger, and
    a spring, the plunger restrained between the serially-connected cells and a sidewall of the battery housing under a counterforce provided by the spring, the plunger including a portion that extends partially into a recess between formed an intermediate wall and an outer sidewall of the battery housing, the recess including a lead wire from the pack electrically connecting the cells of the pack to a charger,
    wherein swelling of the at least one cell assists the plunger to overcome spring pressure to sever the lead wire in the recess to interrupt current.

3. The battery pack of claim 2, wherein the cells are serially connected between power terminals of the pack and interconnected to each other via tab connectors, the tab connectors of adjacent cells connected to each other, and the current interrupt mechanism further Includes at least one tab connector of the at least one swelling cell pulling apart from at least one tab connector of an adjacent cell to interrupt current.

4. The battery pack of claim 1, wherein the current interrupt mechanism comprises:
   a plunger, and
   a spring, the plunger restrained between the serially-connected cells and a sidewall of the battery housing under a counterforce provided by the spring, the plunger including a portion that extends partially into a recess, the recess extending through a sidewall of the battery pack housing and a sidewall of a charger housing,
   wherein a charger lead wire electrically connecting the charger to a corresponding lead wire of the battery pack extends longitudinally along a face of the charger housing sidewall and over the recess, and
   wherein swelling of the at least one cell assists the plunger to overcome spring pressure to sever the charger lead wire extending over the recess to interrupt current.

5. The battery pack of claim 4, wherein the cells are serially connected between power terminals of the pack and interconnected to each other via tab connectors, the tab connectors of adjacent cells connected to each other, and the current interrupt mechanism further includes at least one tab connector of the at least one swelling cell pulling apart from at least one tab connector of an adjacent cell to interrupt current.

6. The battery pack of claim 1, wherein the current interrupt mechanism comprises:
   a plunger, and
   a spring, the plunger restrained between the serially-connected cells and a sidewall of the battery housing under a counterforce provided by the spring, the plunger including a portion that extends partially into a recess between formed a sidewall of the battery pack housing and a housing of the charger,
   wherein a lead wire from the cells is electrically connected to a corresponding lead wire of the charger at a contact interface, and
   wherein swelling of the at least one cell assists the plunger to overcome spring pressure to eject the pack housing from the charger housing, causing a break in the contact interface to interrupt current.

7. The battery pack of claim 6, wherein the cells are serially connected between power terminals of the pack and interconnected to each other via tab connectors, the tab connectors of adjacent cells connected to each other, and the current interrupt mechanism further includes at least one tab connector of the at least one swelling cell pulling apart from at least one tab connector of an adjacent cell to interrupt current.

8. A battery pack comprising:
   a housing;
   a plurality of serially-connected cells residing in the housing; and
   means for interrupting current flow between the cells in response to swelling of at least one cell; and
   wherein the means for interrupting current flow between the cells is further defined as a tab electrically coupled between adjacent cells and configured to separate in response to swelling of at least one of the adjacent cells.

9. The battery pack of claim 8 wherein the means for interrupting current flow between the cells is further defined as a plunger and a spring, the plunger restrained between the serially-connected cells and a sidewall of the battery housing under a counterforce provided by the spring, the plunger including a portion that extends partially into a recess formed between an intermediate wall and an outer sidewall of the battery pack housing, the recess including a lead wire from the pack electrically connecting the cells of the pack to a charger, wherein swelling of the at least one cell causes the plunger to overcome spring pressure to sever the lead wire in the recess to interrupt current.

10. The battery pack of claim 8 wherein the means for interrupting current flow between the cells is further defined as a plunger and a spring, the plunger restrained between the serially-connected cells and a sidewall of the battery housing under a counterforce provided by the spring, the plunger including a portion that extends partially into a recess, the recess extending through a sidewall of the battery pack housing and a sidewall of a charger housing, wherein a charger lead wire electrically connecting the charger to a corresponding lead wire of the battery extends longitudinally along a face of the charger housing sidewall and over the recess, and wherein swelling of the at least one cell assists the plunger to overcome spring pressure to sever the charger lead wire extending over the recess to interrupt current.

11. The battery pack of claim 8 wherein the means for interrupting current flow between the cells is further defined as a plunger and a spring, the plunger restrained between the serially-connected cells and a sidewall of the battery housing under a counterforce provided by the spring, the plunger including a portion that extends partially into a recess formed between a sidewall of the battery pack housing and a housing of the charger, wherein a lead wire from the cells is electrically connected to a corresponding lead wire of the charger at a contact interface, and wherein swelling of the at least one cell causes the plunger to overcome spring pressure to eject the pack housing from the charger housing, causing a break in the contact interface to interrupt current.

12. A battery pack comprising
   a housing;
   a plurality of serially-connected cells residing in the housing; and
   metal tab connectors electrically coupled between adjacent cells, each tab is configured to separate in response to swelling of at least one of the adjacent cells, thereby interrupting current flow between the adjacent cells.

* * * * *

UNITED STATES PATENT AND TRADEMARK OFFICE
CERTIFICATE OF CORRECTION

PATENT NO. : 7,602,146 B2
APPLICATION NO. : 12/079429
DATED : October 13, 2009
INVENTOR(S) : David A. Carrier et al.

It is certified that error appears in the above-identified patent and that said Letters Patent is hereby corrected as shown below:

Column 20,
Line 57, after "battery" insert -- pack --.
Line 67, "Includes" should be -- includes --.

Column 22,
Line 26, after "battery" insert -- pack --.

Signed and Sealed this

First Day of December, 2009

David J. Kappos
*Director of the United States Patent and Trademark Office*